US008311890B2

(12) United States Patent
Donovan et al.

(10) Patent No.: US 8,311,890 B2
(45) Date of Patent: Nov. 13, 2012

(54) METHOD AND SYSTEM FOR DYNAMIC TEXTUAL AD DISTRIBUTION VIA EMAIL

(75) Inventors: Kevin R J B Donovan, White Plains, NY (US); David Bard Hills, New York, NY (US); William C. Day, Haworth, NJ (US); Ron McCoy, Doraville, GA (US); Christopher Joseph Murphy, Lagrangeville, NY (US); Eimear Kathleen O'Connell, New York, NY (US)

(73) Assignee: Google Inc., Mountain View, CA (US)

( * ) Notice: Subject to any disclaimer, the term of this patent is extended or adjusted under 35 U.S.C. 154(b) by 1712 days.

(21) Appl. No.: 10/647,116

(22) Filed: Aug. 25, 2003

(65) Prior Publication Data

US 2004/0249709 A1 Dec. 9, 2004

Related U.S. Application Data

(60) Provisional application No. 60/422,844, filed on Nov. 1, 2002.

(51) Int. Cl.
*G06Q 30/00* (2012.01)
(52) U.S. Cl. ................. 705/14.73; 705/14.4; 705/26.3
(58) Field of Classification Search .............. 705/14.4, 705/14.73, 26.3
See application file for complete search history.

(56) References Cited

U.S. PATENT DOCUMENTS

| 5,636,346 A | 6/1997 | Saxe |
| 5,724,521 A | 3/1998 | Dedrick et al. |
| 5,835,087 A * | 11/1998 | Herz et al. .................. 715/810 |
| 5,845,265 A | 12/1998 | Woolston |
| 5,918,010 A | 6/1999 | Appleman et al. |
| 5,920,854 A | 7/1999 | Kirsch et al. |
| 5,931,901 A | 8/1999 | Wolfe et al. |

(Continued)

FOREIGN PATENT DOCUMENTS

EP 1026610 A2 8/2000

(Continued)

OTHER PUBLICATIONS

Google Introduces New Pricing for Popular Self-Service Online Advertising Program, http://www.google.com/press/pressrel/select.html, p. 1-2, dated Feb. 20, 2002, printed on Jul. 29, 2003.

(Continued)

*Primary Examiner* — Raquel Alvarez
(74) *Attorney, Agent, or Firm* — Fish & Richardson P.C.

(57) ABSTRACT

A system and method for providing dynamic pay-for-placement advertisements via graphics-enabled email that generates a display of advertisements when the email newsletter is opened so the advertisements displayed are based on rankings at the time the email is opened instead of when the email was generated and transmitted. In one embodiment, a graphical-content email having one or more embedded advertisement image references is provided to one or more email recipients. The advertisement image reference, in one embodiment, may include query string parameters indicating the context of the image reference and/or portion of the image reference (i.e., identifying the image reference as being part of a particular newsletter email), a position of the image reference in the email display, and the like. A URL reference also may be included with each advertisement image reference (.e.g., one URL for each advertisement portion of the image to be retrieved by the advertising image reference).

24 Claims, 25 Drawing Sheets

U.S. PATENT DOCUMENTS

| | | | |
|---|---|---|---|
| 5,974,398 | A | 10/1999 | Hanson et al. |
| 6,026,368 | A | 2/2000 | Brown et al. |
| 6,044,375 | A | 3/2000 | Shmueli et al. |
| 6,061,659 | A | 5/2000 | Murray |
| 6,067,570 | A | 5/2000 | Kreynin et al. |
| 6,078,866 | A | 6/2000 | Buck et al. |
| 6,119,098 | A | 9/2000 | Guyot et al. |
| 6,223,163 | B1 | 4/2001 | Van Luchene |
| 6,230,170 | B1 | 5/2001 | Zellweger et al. |
| 6,247,009 | B1 | 6/2001 | Shiiyama et al. |
| 6,253,189 | B1 | 6/2001 | Feezell et al. |
| 6,260,024 | B1 * | 7/2001 | Shkedy ............... 705/37 |
| 6,269,361 | B1 | 7/2001 | Davis et al. |
| 6,285,987 | B1 | 9/2001 | Roth et al. |
| 6,298,348 | B1 | 10/2001 | Eldering |
| 6,324,519 | B1 | 11/2001 | Eldering |
| 6,336,132 | B2 | 1/2002 | Appleman et al. |
| 6,421,675 | B1 | 7/2002 | Ryan et al. |
| 6,598,027 | B1 | 7/2003 | Breen, Jr. et al. |
| 7,062,453 | B1 * | 6/2006 | Clarke ............... 705/26 |
| 7,076,443 | B1 * | 7/2006 | Emens et al. ............ 705/14 |
| 2001/0042064 | A1 | 11/2001 | Davis et al. |
| 2001/0047297 | A1 | 11/2001 | Wen |
| 2001/0051911 | A1 | 12/2001 | Marks et al. |
| 2002/0002509 | A1 | 1/2002 | Wagorn et al. |
| 2002/0002525 | A1 | 1/2002 | Arai et al. |
| 2002/0010756 | A1 | 1/2002 | Oku |
| 2002/0026359 | A1 | 2/2002 | Long et al. |
| 2002/0035536 | A1 | 3/2002 | Gellman |
| 2002/0038282 | A1 | 3/2002 | Montgomery |
| 2002/0046099 | A1 | 4/2002 | Frengut et al. |
| 2002/0046104 | A1 | 4/2002 | Kaddeche et al. |
| 2002/0077891 | A1 | 6/2002 | Castle et al. |
| 2002/0099605 | A1 | 7/2002 | Weitzman et al. |
| 2002/0111898 | A1 | 8/2002 | Numaoka et al. |
| 2002/0123912 | A1 * | 9/2002 | Subramanian et al. ........... 705/5 |
| 2002/0123988 | A1 | 9/2002 | Dean et al. |
| 2002/0165773 | A1 | 11/2002 | Natsuno et al. |
| 2002/0184097 | A1 | 12/2002 | Hijiri et al. |
| 2002/0194062 | A1 | 12/2002 | Linide |
| 2002/0198780 | A1 | 12/2002 | Kawakami et al. |
| 2003/0037334 | A1 | 2/2003 | Khoo et al. |
| 2003/0070167 | A1 | 4/2003 | Holtz et al. |
| 2003/0083937 | A1 | 5/2003 | Hasegawa et al. |
| 2003/0149618 | A1 | 8/2003 | Sender et al. |
| 2003/0163372 | A1 | 8/2003 | Kolsy |
| 2003/0216963 | A1 | 11/2003 | Ishiwaka et al. |
| 2004/0015397 | A1 | 1/2004 | Barry et al. |
| 2004/0019523 | A1 | 1/2004 | Barry et al. |
| 2004/0044571 | A1 | 3/2004 | Bronnimann et al. |
| 2004/0054577 | A1 | 3/2004 | Inoue et al. |
| 2004/0054589 | A1 | 3/2004 | Nicholas et al. |
| 2004/0059708 | A1 | 3/2004 | Dean et al. |
| 2004/0059712 | A1 | 3/2004 | Dean et al. |
| 2004/0093327 | A1 | 5/2004 | Anderson et al. |
| 2004/0093620 | A1 | 5/2004 | Iino et al. |
| 2004/0119740 | A1 | 6/2004 | Chang et al. |
| 2004/0143499 | A1 | 7/2004 | Dietsch et al. |
| 2004/0143843 | A1 | 7/2004 | Khoo et al. |
| 2004/0167928 | A1 | 8/2004 | Anderson et al. |
| 2004/0249709 | A1 | 12/2004 | Donovan et al. |
| 2005/0065806 | A1 | 3/2005 | Harik |
| 2005/0071224 | A1 | 3/2005 | Fikes et al. |
| 2005/0096979 | A1 | 5/2005 | Koningstein |
| 2005/0131758 | A1 | 6/2005 | Desikan et al. |
| 2005/0131762 | A1 | 6/2005 | Bharat et al. |
| 2005/0144069 | A1 | 6/2005 | Wiseman et al. |
| 2005/0216335 | A1 | 9/2005 | Fikes et al. |
| 2005/0222900 | A1 | 10/2005 | Fuloria et al. |
| 2005/0222903 | A1 | 10/2005 | Buchheit et al. |
| 2005/0222989 | A1 | 10/2005 | Haveliwala et al. |
| 2005/0223002 | A1 | 10/2005 | Agarwal et al. |

FOREIGN PATENT DOCUMENTS

| | | |
|---|---|---|
| EP | 1128288 | 8/2001 |
| EP | 1563427 | 5/2005 |
| JP | 2001-514772 | 6/1998 |
| JP | 2001-514772 | 8/1998 |
| JP | 2001-250052 | 9/2001 |
| JP | 2002-41533 | 2/2002 |
| JP | 2002-170039 | 6/2002 |
| JP | 2002-175333 | 6/2002 |
| JP | 2002-251351 | 9/2002 |
| JP | 2002-269151 | 9/2002 |
| JP | 2002-269449 | 9/2002 |
| KR | 2001-44650 | 6/2001 |
| KR | 2002-3394 | 1/2002 |
| KR | 2002-13332 | 2/2002 |
| WO | 00/30009 | 5/2000 |
| WO | WO 0038074 | 6/2000 |
| WO | 01/43009 | 6/2001 |
| WO | 01/52161 | 7/2001 |
| WO | 02/060110 | 8/2002 |
| WO | 02/061608 | 8/2002 |
| WO | WO 2004/042525 | 5/2004 |

OTHER PUBLICATIONS

Collection of pages from www.overture.com, printed on Jul. 29, 2003.

Collection of pages from findwhat.com, http://www.findwhat.com, printed on Jul. 29, 2003.

Collection of pages from Sprinks.com, http://www.sprinks.com, printed on Jul. 29, 2003.

Collection of pages from Kandoodle.com, http://www.kanoodle.com, printed on Jul. 29, 2003.

Collection of pages from Google Advertising, http://www.google.com, printed on Jul. 29, 2003.

Chris Sherman, "Google Launches AdWords Select," Feb. 20, 2002, 6 pages.

International Search Report of PCT/US2003/034788, Feb. 28, 2005, 4 pages.

Japanese Office Action, Japanese Patent Application No. 2005/502248, dated Apr. 1, 2010, 2 pages.

Second Examination Report dated Jul. 11, 2012 from related European Patent Application No. 03778057.4, 8 pages.

* cited by examiner

| SIGN UP | |
|---|---|
| CREATE USERNAME & PASSWORD | |
| CHOOSE A USERNAME | Advertiser1 |
| ENTER YOUR EMAIL ADDRESS | Ad1@advertiser1.com |
| PASSWORD | ****** |
| CONFIRM PASSWORD | ****** |
| CANCEL | CONTINUE |

PLACE ADVERTISEMENT USING SEARCH TERM

PRIMARY ADVERTISEMENT

| | | |
|---|---|---|
| ENTER SEARCH TERM | video game | —402 |
| ENTER LISTING TITLE | V-G video games for sale | —404 |
| ENTER DISPLAY URL | www.v-g.com | —406 |
| ENTER TARGETED URL | www.v-g.com/model52.html | —408 |
| ENTER DESCRIPTION | V-G has games for all interests | —410 |
| SUBMIT PRICING | $0.20 | —412 |
| ADD OTHER SEARCH TERMS | | |

CANCEL     SUBMIT & CONTINUE

PLACE ADVERTISEMENT USING SEARCH TERM

ALTERNATIVE ADVERTISEMENT

| | | |
|---|---|---|
| ENTER SEARCH TERM | video games | — 402 |
| ENTER LISTING TITLE | V-G - we got games | — 404 |
| ENTER DISPLAY URL | www.v-g.com | — 406 |
| ENTER TARGETED URL | www.v-g.com/model52.html | — 408 |
| ENTER DESCRIPTION | V-G basketball online - WE GOT GAME! | — 410 |
| SUBMIT PRICING | $0.25 | — 412 |
| ADD OTHER SEARCH TERMS | | |

CANCEL   SUBMIT & CONTINUE

| | CONFIRM LISTINGS FOR SEARCH TERMS | | | | | |
|---|---|---|---|---|---|---|
| # | SEARCH TERM | TITLE | URL | PRICE | RANK | |
| 1 | video games | V-G video games on sale | www.v-g.com | $0.20 | 3 | EDIT |
| 2 | video games | V-G WE GOT GAMES | | $0.25 | 1 | EDIT |
| 3 | | | | | | EDIT |
| 4 | | | | | | EDIT |

CANCEL                              CONFIRM & CONTINUE

500                    Fig. 5

| PLACE ADVERTISEMENT ON LEVEL NODES | | |
|---|---|---|
| CHOOSE CATEGORIES BASED UPON KEYWORD | | |
| ☐ ALL SUGGESTED CATEGORIES<br>☐ PREGNANCY<br>☐ PARENTING<br>☐ BREASTFEEDING<br>☐ PREGNANCY/BIRTH<br>☐ POST PARTUM | | |
| CHANNEL<br>LEVEL NODES | SUBJECT<br>LEVEL NODES | DOCUMENT<br>LEVEL NODES |
| ☐ ARTS & ENTERTAINMENT<br>☐ AUTOMOTIVE<br>☐ COMPUTING & TECHNOLOGY<br>☐ EDUCATION<br>☐ HEALTH & FITNESS<br>☐ HOUSE & HOME<br>☐ JOBS & CAREERS<br>☐ MONEY<br>☐ PARENTING & FAMILY | | |
| CANCEL | | SAVE & CONTINUE |

| PLACE ADVERTISEMENT ON LEVEL NODES |||
|---|---|---|
| CHOOSE CATEGORIES BASED UPON KEYWORD |||
| ☐ ALL SUGGESTED CATEGORIES <br> ☐ PREGNANCY <br> ☐ PARENTING <br> ☐ BREASTFEEDING <br> ☐ PREGNANCY/BIRTH <br> ☐ POST PARTUM |||
| CHANNEL LEVEL NODES | SUBJECT LEVEL NODES | DOCUMENT LEVEL NODES |
| ☒ PARENTING & FAMILY | ☐ ADOPTION <br> ☐ DAYCARE/PRESCHOOL <br> ☐ FATHERHOOD <br> ☐ PREGNANCY/BIRTH <br> ☐ SINGLE PARENTS <br> ☐ STAY-AT-HOME PARENTS <br> ☐ PARENTING SPECIAL NEEDS <br> ☐ PARENTING: BABIES & TODDLERS | |
| CANCEL || SAVE & CONTINUE |

| PLACE ADVERTISEMENT ON LEVEL NODES |||
|---|---|---|
| CHOOSE CATEGORIES BASED UPON KEYWORD |||
| ☐ ALL SUGGESTED CATEGORIES <br> ☐ PREGNANCY <br> ☐ PARENTING <br> ☐ BREAST FEEDING <br> ☐ PREGNANCY/BIRTH <br> ☐ POST PARTUM |||
| CHANNEL LEVEL NODES | SUBJECT LEVEL NODES | DOCUMENT LEVEL NODES |
| ☒ PARENTING & FAMILY | ☒ PREGNANCY/ BIRTH | ☐ GETTING PREGNANT <br> ☐ SIGNS & SYMPTOMS <br> ☐ PREGNANCY <br> ☐ PRENATAL TESTS <br> ☐ LABOR & BIRTH <br> ☐ POST PARTUM <br> ☐ YOUR BABY <br> ☐ BREAST FEEDING <br> ☐ PREGNANCY LOSS |
| CANCEL || SAVE & CONTINUE |

PLACE ADVERTISEMENT ON LEVEL NODES

CONFIRM LISTINGS

- [X] PREGNANCY
- [X] LABOR & BIRTH
- [X] POST PARTUM
- [X] YOUR BABY
- [X] BREAST FEEDING

UNCHECK THE CATEGORIES THAT YOU DO NOT WANT AND CLICK 'UPDATE CHANGES' BEFORE SAVING.

900

UPDATE CHANGES

CANCEL   SAVE & CONTINUE

Fig. 9

| PLACE ADVERTISEMENT ON LEVEL NODES | |
|---|---|
| PRIMARY LISTING: PARENTING & FAMILY/PREGNANCY/BIRTH/ BREAST FEEDING | |
| ENTER LISTING TITLE | B-P breast pumps for sale —1002 |
| ENTER DISPLAY URL | www.b-p.com/modelB —1004 |
| ENTER TARGETED URL | www.b-p.com/modelB —1006 |
| ENTER DESCRIPTION | Purchase now...limited time offer on B-P breast pumps —1008 |
| SUBMIT PRICING | $0.12 —1010 |
| CANCEL | SUBMIT & CONTINUE |

| PLACE ADVERTISEMENT ON LEVEL NODES |
|---|
| ALTERNATE LISTING: PARENTING & FAMILY/PREGNANCY/BIRTH/ BREAST FEEDING |

| | |
|---|---|
| ENTER LISTING TITLE | b-p breast pumps —1002 |
| ENTER DISPLAY URL | www.b-p.com —1004 |
| ENTER TARGETED URL | www.b-p.com —1006 |
| ENTER DESCRIPTION | B-P - when only the best will suit your baby —1008 |
| SUBMIT PRICING | $0.15 —1010 |
| CANCEL | SUBMIT & CONTINUE |

PLACE ADVERTISEMENTS ON LEVEL NODES

CONFIRM LISTINGS

| # | CATEGORY | TITLE | URL | BID | RANK | |
|---|---|---|---|---|---|---|
| 1 | PREGNANCY | BREAST PUMPS | www.b-p.com | $.10 | 2 | EDIT |
| 2 | LABOR & BIRTH | BREAST PUMPS | www.b-p.com | $.08 | 2 | EDIT |
| 3 | POST PARTUM | BREAST PUMPS | www.b-p.com | $.02 | 3 | EDIT |
| 4 | YOUR BABY | BREAST PUMPS | www.b-p.com | $.05 | 5 | EDIT |
| 5 | BREAST FEEDING | BREAST PUMPS | www.b-p.com | $.15 | 1 | EDIT |

CANCEL     CONFIRM & CONTINUE

| SIGN UP | |
|---|---|
| PROVIDE CONTACT INFORMATION | |
| FIRST NAME | John —1202 |
| LAST NAME | Advertiser —1204 |
| COMPANY NAME | Advertiser1.com —1204 |
| STREET ADDRESS | 100 Advertiser.way —1206 |
| CITY | Adville —1208 |
| STATE  New York  1210  ZIP | 55555 —1212 |
| COUNTRY | USA —1214 |
| YOUR PRIMARY EMAIL ADDRESS | john@advertiser1.com —1216 |
| PHONE NUMBER | 555-555-5555 —1218 |
| FAX NUMBER | 555-555-5556 —1220 |
| INDUSTRY | Consumer Health —1222 |
| CANCEL | SAVE & CONTINUE |

| SIGN UP | | |
|---|---|---|
| PROVIDE BILLING INFORMATION | | |
| CREDIT CARD INFORMATION | | |
| CARD TYPE | Visa | ⎫ |
| CARD NUMBER | 555-5555-5555-5555 | ⎬ 1302 |
| EXPIRATION DATE | 12     05 | ⎪ |
| SECURITY CODE (IF APPLICABLE) | 982 | ⎭ |
| ACCOUNT AUTO-REPLENISH | | |
| SIGN ME UP FOR AUTO-REPLENISH | [X] | — 1304 |
| WHEN MY ACCOUNT BALANCE REACHES | $ | |
| CHARGE MY CARD FOR THIS AMOUNT | $ | — 1300 |
| BILLING ADDRESS | | ⎫ |
| [X]  SAME AS MY CONTACT ADDRESS | | ⎪ |
| FIRST NAME | | ⎪ |
| LAST NAME | | ⎪ |
| STREET ADDRESS | | ⎬ 1306 |
| CITY | | ⎪ |
| STATE          ZIP | | ⎪ |
| COUNTRY | | ⎭ |
| CANCEL | SAVE & CONTINUE | |

Fig. 13

| ACCOUNT REGISTRATION SUMMARY | |
|---|---|
| YOU SIGNED UP FOR THE FOLLOWING: | |
| (#) SEARCH ITEMS | EDIT |
| (#) NODE LEVEL LISTINGS | EDIT |
| CONTACT INFORMATION<br><br>John Doe<br>JoDo Industries<br>72 Bedford Street<br>New York, NY 11014<br>USA<br>(FAX) 646-555-1111<br>(PH) 646-555-1212 | EDIT |
| BILLING INFORMATION | |
| CREDIT CARD: AM EX NO. 555555555 exp. 9999 | EDIT |
| AUTO-REPLENISH IS ACTIVE | EDIT |
| BILLING ADDRESS<br><br>72 Bedford Street<br>New York, NY 11014<br>USA | EDIT |
| CANCEL | REGISTER |

| Keyword | Advertiser | Ad | Period | Click Through Rate | Price | RPM | Current Rank | New Rank |
|---|---|---|---|---|---|---|---|---|
| DVD | ABC, Inc. | Prim | 8/20/02 | 20% | 0.25 | 50.00 | 1 | 1 |
| DVD | DEF, Inc. | Prim | 8/20/02 | 10% | 0.24 | 24.00 | 2 | 3 |
| DVD | GHI, Inc. | Prim | 8/20/02 | 12% | 0.21 | 25.20 | 3 | 2 |
| DVD | JKL, Inc. | Sec | 8/20/02 | 2% | 0.15 | 3.00 | 4 | 9 |
| DVD | MNO, Inc. | Prim | 8/20/02 | 3% | 0.14 | 4.20 | 5 | 8 |
| DVD | PQR, Inc. | Sec | 8/20/02 | 15% | 0.12 | 18.00 | 6 | 4 |
| DVD | STU, Inc. | Sec | 8/20/02 | 6% | 0.12 | 7.20 | 6 | 5 |
| DVD | VWX, Inc. | Prim | 8/20/02 | 7% | 0.10 | 7.00 | 8 | 6 |
| DVD | YZ, Inc. | Prim | 8/20/02 | 10% | 0.05 | 5.00 | 9 | 7 |

Fig. 16

| Advertiser | Distribution Type | Distribution Value | Ad | RPM | Active Ad | New Active Ad |
|---|---|---|---|---|---|---|
| ABC, Inc. | Keyword | DVD | #1 | 50.00 | #1 | |
| ABC, Inc. | Keyword | DVD | #2 | 47.00 | #1 | #3 |
| ABC, Inc. | Keyword | DVD | #3 | 52.00 | #1 | #3 |
| ABC, Inc. | Keyword | DVD | #4 | 15.00 | #1 | #3 |
| DEF, Inc. | Content | Pregnancy.About.com | #1 | 25.00 | #1 | #3 |
| DEF, Inc. | Content | Pregnancy.About.com | #2 | 15.00 | #1 | #1 |

Fig. 17

Advertiser ABC, Inc.
Keyword DVD

| Advertisement | Period | RPM |
|---|---|---|
| Ad #1 | 8/15/02 0400-1200 | 50.00 |
| Ad #2 | 8/15/02 0400-1200 | 47.00 |
| Ad #3 | 8/15/02 0400-1200 | 51.00 |
| Ad #1 | 8/15/02 1200-1800 | 50.00 |
| Ad #2 | 8/15/02 1200-0800 | 40.00 |
| Ad #3 | 8/15/02 1200-1800 | 56.00 |
| Ad #1 | 8/15/02 1800-2400 | 50.00 |
| Ad #2 | 8/15/02 1800-2400 | 51.00 |
| Ad #3 | 8/15/02 1800-2400 | 42.00 |
| Ad #1 | 8/15/02 0000-0400 | 50.00 |
| Ad #2 | 8/15/02 0000-0400 | 32.00 |
| Ad #3 | 8/15/02 0000-0400 | 40.00 |

Fig. 19

METHOD AND SYSTEM FOR DYNAMIC TEXTUAL AD DISTRIBUTION VIA EMAIL

RELATED APPLICATIONS

This application claims priority to a provisional patent application, U.S. Patent Application No. 60/422,844, filed Nov. 1, 2002, entitled "Method and System for Dynamic Textual Ad Distribution via Email," still pending.

FIELD OF THE INVENTION

This invention relates to systems and methods for providing dynamic graphical or textual advertisements via email or other stored electronic documents in pay-for-placement or similar advertising systems.

BACKGROUND OF THE INVENTION

One form of targeted advertising often used in electronic media is a bid for placement in broadcast emails targeted to a specific group of recipients having one or more interests in common. For example, newsletter emails on a specific topic (e.g., parenthood) often include a number of Uniform Resource Locator (URL) listings to websites of advertisers catering to the specific topic (e.g., a toy store's website), whereupon the recipients of the newsletter email can "click" on the link to view the advertised website via a web browser (an event herein referred to as a "click-through").

Advertisers may place a bid on the amount of money to be paid for any "click-through" resulting from the placement of an advertisement included in the targeted email. In fact, several advertisers may bid against each other for placement, with the highest bidder given priority over other bidders. For example, the highest bid for a newsletter email may be listed first and other bidder's advertisements can be listed in descending order based on their bid. Accordingly, as the cost per click-through (e.g., bid) for the advertising company increases, the closer that company's listing is to the most visible or prominent part of the newsletter email (e.g., the top of the newsletter email). Higher placement of the advertisement in a newsletter email often leads to more click-throughs for that advertisement and thus, more traffic to the advertiser's target web site.

While such pay-for-placement email advertisements provide benefit to advertisers seeking targeted advertising mechanisms, the email provider often does not experience the full revenue potential possible from the pay-for-placement advertising in the emails. Common pay-for-placement email advertising systems typically do not take into account variations in the relationship between the advertiser, the email provider, and the content of the newsletter emails. To illustrate, advertisers continuously change their bids for advertisement placement, relationships with new advertisers may be developed, relationships with advertisers may be ended, new advertisements may be available, etc.

While the relationship between an advertiser and the email provider may be fluid, a newsletter email typically is persistent, being delivered to recipients' mailboxes typically within minutes of being sent. The newsletter then may reside in a recipient's mailbox for an unknown period of time (e.g., for minutes, hours, days, weeks, months, etc.) after it was originally delivered before the recipient views the newsletter email. During this variable time period, the relationship between the newsletter email provider and the advertisers having advertisements listed in the delivered newsletter email may have changed. For example, some or all of the listed advertisers' accounts may have been depleted of money, some or all of the listed advertisers may no longer have a relationship with the pay-for-placement email provider, the relative ranking of the bids by advertisers may have changed in the duration, and the like. Accordingly, the arrangement of the advertisement listings in the original newsletter email when sent may not reflect the arrangement of advertisement listings that is most advantageous to the email provider at the time that the newsletter email is opened by a recipient.

To illustrate, an advertiser, based in its bid, may be listed in the most prominent position at the time of transmission of a newsletter email. In the time period between the transmission of the email and the viewing of the email by a recipient, however, the advertiser terminated its relationship with the newsletter email provider and, therefore, no longer has a paying relationship with the email provider. Accordingly, any click-throughs to the terminated advertiser resulting from the recipient clicking the terminated advertisers listing in the newsletter email is, in essence, lost revenue for the email provider since the terminated advertiser receives these click-throughs for free. In a similar manner, any changes in the bids or rate of click-throughs for the advertisers since transmission would not be reflected in the advertising listings in the email as transmitted. As a result, the email provider may not realize its full revenue potential had the advertising listings in the newsletter email reflected the optimum advertising listing arrangement at the time the email was viewed by a recipient. Other drawbacks exist with current techniques for targeted advertising via email.

SUMMARY OF THE INVENTION

Embodiments of the present invention mitigate or solve the above-identified limitations in known solutions, as well as other unspecified deficiencies in known solutions. A number of advantages associated with the present invention are readily evident to those skilled in the art, including economy of design and resources, greater system flexibility, cost savings, etc.

At least one embodiment of the present invention provides a system and method for providing dynamic pay-for-placement advertisements via graphics-enabled email that generates a display of advertisements when the email newsletter is opened so the advertisements displayed are based on rankings at the time the email is opened instead of when the email was generated and transmitted. In one embodiment, a graphical-content email having one or more embedded advertisement image references is provided to one or more email recipients. The advertisement image reference, in one embodiment, may include query string parameters indicating the context of the image reference and/or portion of the image reference (i.e., identifying the image reference as being part of a particular newsletter email), a position of the image reference in the email display, and the like. A URL reference also may be included with each advertisement image reference (.e.g., one URL for each advertisement portion of the image to be retrieved by the advertising image reference).

When the email is opened in a graphics-enabled email client, the email client interprets instructions in the email to request the one or more referenced advertisement images from a advertisement system. The advertisement system, in one embodiment, is adapted to determine a preferred advertisement layout in response to the image request. The advertisements included in the preferred advertisement layout may then be based in part on the current relationships (i.e., at the time the email is opened) between the content provider and its pay-for-placement advertisers, the placement of the advertisement in the email display, or a combination thereof. The advertisement system then provides the email client with advertisement images that correspond to the preferred advertisement layout at the time the email is opened. In addition to providing the advertisement image or images requested by the email client displaying the transmitted email, the advertisement system also can be adapted to store a browser cookie at the email client, where the browser cookie stores a reference to the particular advertisement layout displayed in the email.

A referenced advertisement image in the email can include a graphical image, a graphical representation of text, or a combination thereof. Further, two or more advertisement listings can be grouped together under a single image with certain portions of the single image being associated with each of the advertisement listings using, for example, an HTML image map.

Upon receipt of the advertisement image(s), the email client displays the email content along with the supplied advertisement images as directed by the email. Should the email recipient "click" one of the displayed advertisement images, in one embodiment, the email client sends a request for the website referenced by the associated URL reference. The browser cookie reference to the particular advertisement layout may be included in the request. Upon receipt of the website request, the advertisement system directs the email client (or a web browser of the email recipient) to display the content of a corresponding advertiser's website. In one embodiment, the advertisement system identifies the corresponding website using the browser cookie reference included in the webpage request from the email client, a position indicator associated with the selected advertisement image, and the like. After the email client (or web browser) is successfully directed to the corresponding website of the selected advertiser, the advertisement system may record the "click-through" for billing purposes.

One embodiment comprises a computerized advertisement distribution and delivery system for dynamically delivering advertisements for inclusion in an electronic document delivered to and stored at a recipient system. The computerized advertisement distribution and delivery system comprises an advertisement image generation module that generates an image containing a plurality of advertisements related to a specific distribution subject based on a relationship between those advertisements and storing that image in association with a network-based locator as being the up-to-date image for the specific distribution subject. The system may also include an advertisement relationship determination module intermittently determining relationships between advertisements related to a specific distribution subject and if an existing relationship between advertisements related to a specific distribution subject changes, initiating the advertisement image generation module to generate as modified up-to-date image stored in association with the network-based locator and specific distribution subject.

In addition, the system comprises an electronic document transmission system that creates and transmits an electronic document containing content related to a specific distribution subject and a network-based locator associated with the image generated by the advertisement image generation module for the specific distribution subject. An advertisement image transmission system then receives a request for the image located at the network-based locator specified in the electronic document transmitted by the electronic document transmission module and transmitting the up-to-date image stored in association with the network-based locator at the time the request is received. All such systems may cooperate with an advertisement input receiving system for receiving at least one advertisement associated with a specific distribution subject and a bid representing an amount to be paid for click-throughs by end-user recipients to a target site associated with the advertisement.

In these systems, a variety of advertisement relationship determinations may be employed to determine which advertisements to provide in the image(s). In one iteration, the advertisement relationship determination module evaluates a grouping of advertisements based on the effective revenue efficiency of the grouping compared to other potential groupings of advertisements provided by advertisers for the specific distribution subject and determines the relationship for generating an image using the highest revenue efficiency grouping of a predetermined number of advertisements. More specifically, the system may generate a ranking of listings as a grouping, the grouping comprising the ranked list of advertisements with the highest effective cost per thousand impressions. Also or alternatively, the revenue efficiency value may be calculated by multiplying the number of click-throughs over a predetermined number of impressions times the bid amount for the advertisement. These relationships may be re-evaluated whenever a new bid is received (either a new advertiser or a modification to an existing bid) or when revenue efficiency calculations are made (e.g., every thousand impressions).

Moreover, the electronic document may include a target network-based locator for each of a plurality of advertisements included in the image and the system may thus provide a redirection server for receiving a request at the target network-based location and redirecting the request to a location associated with the advertisement associated with the target network-based locator in the electronic document.

One embodiment of an electronic document (e.g., email newsletter in HTML format) may comprise program interpreted code for instructing a recipient program to present content related to a specific distribution topic in a page when the electronic document is opened by the recipient program, to retrieve an image from a source network-based location and present that image in the page with the content related to the specific distribution topic when the electronic document is opened by the recipient program, to request a first web page from a first target network-based locator when a first portion of the image is selected, and to request a second web page from a second target network-based locator when a second portion of the image is selected. And, in one iteration, the first and second target network-based locators direct the recipient program to a location on the network where a first and second advertiser web page location respectively are stored.

In various iterations, the source network-based locator comprises a URL with an identifier related to the specific distribution subject. Also, it is possible to provide an electronic document in which the first and second target network-based locators comprises an address portion and a variable portion and wherein the address portion of the first and second target network-based locators is the same.

According to another embodiment, a computerized advertisement distribution and delivery system for dynamically delivering advertisements for inclusion in an electronic document delivered to and stored at a recipient system may provide an advertisement image generation module for generating a plurality of images corresponding to a specific distribution subject, ordering those plurality of images based on a relationship between those advertisements and storing those images in association with a plurality of network-based locators as being the up-to-date image grouping for the specific distribution subject. This embodiment's system may also provide an advertisement relationship determination module for intermittently determining relationships between advertisements related to a specific distribution subject and if an existing relationship between advertisements related to a specific distribution subject changes, initiating the advertisement image generation module to reorder the images and store the reordering information to generate a up-to-date image grouping stored in association with the plurality of network-based locators and specific distribution subject. The electronic document transmission system may create and transmit an electronic document containing content related to a specific distribution subject and at least two of the plurality of network-based locators associated with the up-to-date grouping of images generated by the advertisement image generation module for the specific distribution subject. Further, an advertisement image transmission module may receive a request for the up-to-date images located at the at least two of the plurality of network-based locators specified in the electronic document transmitted by the electronic document transmission module and transmitting the up-to-date images associated with the plurality of network-based locators stored in association with the network-based locator at the time the request is received. Other variations described above with respect to the first embodiment may also be employed.

Other objects and advantages of the present invention will be apparent to one of ordinary skill in the art upon review of the descriptions and drawings provided.

BRIEF DESCRIPTION OF THE DRAWINGS

The purpose and advantages of embodiments of the present invention will be apparent to those of ordinary skill in the art from the following detailed description in conjunction with the appended drawings in which like reference characters are used to indicate like elements, and in which:

FIG. 3 depicts a graphical user interface for use in enabling a user to create an account as the first step in providing an advertisement for distribution through Internet channels according to an embodiment of the present invention.

FIGS. 4(a)-(b) depict a graphical user interface for use with listing one or more bid-based advertisements for use in a ranked placement keyword output system according to an embodiment of the present invention.

FIG. 5 depicts a graphical user interface for use in confirming one or more advertisement listings made by an advertiser according to an embodiment of the present invention.

FIG. 6 depicts a graphical user interface for enabling an advertiser to place a content-based advertisement in a ranked placement system wherein the content-based system provides for advertising at different levels of granularity including category level, channel level and document level according to an embodiment of the present invention.

FIG. 7 depicts a graphical user interface for enabling selection of a subject level for placement of an advertisement according to an embodiment of the present invention.

FIG. 8 depicts a graphical user interface for enabling selection of a document level for placement of an advertisement according to an embodiment of the present invention.

FIG. 9 depicts a graphical user interface for enabling an advertiser to confirm the categories in which the advertisement is to be placed according to an embodiment of the present invention.

FIGS. 10(a)-(b) depicts graphical user interfaces for enabling an advertiser to provide one or more advertisements associated with a content-based advertisement bid in a ranked advertisement distribution system according to an embodiment of the present invention.

FIG. 11 depicts a graphical user interface for enabling the confirmation of advertisement listings for listings made on category level advertisements according to an embodiment of the present invention.

FIG. 12 depicts a graphical user interface for enabling an advertiser to provide contact information step of listing an advertisement on level nodes according to an embodiment of the present invention.

FIG. 13 depicts a graphical user interface for enabling an advertiser to provide billing information step of listing an advertisement on level nodes according to an embodiment of the present invention.

FIG. 14 depicts a graphical user interface for enabling an advertiser to create an account to list an advertisement on level nodes according to an embodiment of the present invention.

FIG. 16 depicts a table providing an example of data collected during an evaluation of ranking of advertisements for a specified keyword within a keyword-based advertisement distribution system according to an embodiment of the present invention.

FIG. 17 depicts a table providing an example of data collected and generated during an evaluation of ranking of a plurality of advertisements with a keyword and content-based advertisement context according to an embodiment of the present invention.

FIG. 19 depicts a table providing an example of data collected and evaluated for a plurality of advertisements by a single advertiser over various time periods to determine the optimal advertisement for the advertiser at various times according to an embodiment of the present invention.

DETAILED DESCRIPTION OF EMBODIMENTS

Figure 20:
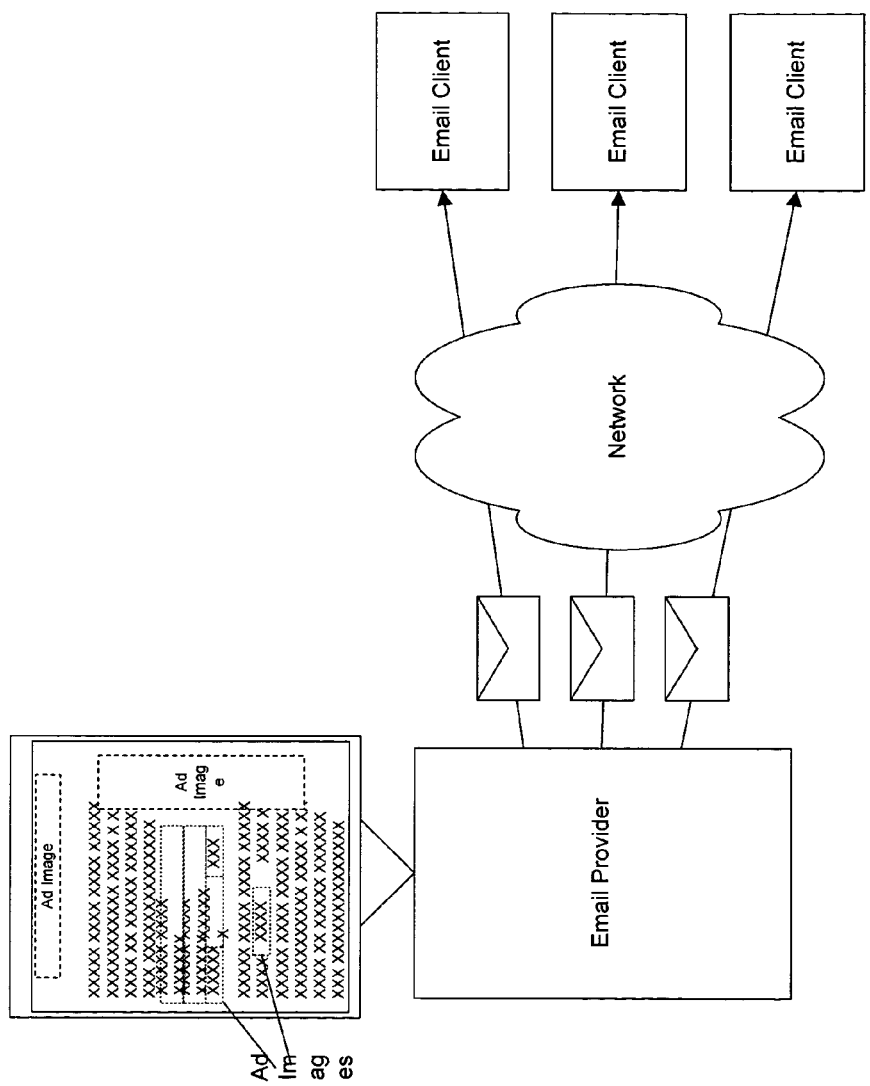
FIG. 20 depicts a system for distribution of an email having advertisements dynamically selected based on a bid-based advertisement selection technique according to an embodiment of the present invention.

Embodiments of the present invention deliver up-to-date and timely advertisements. One system embodying various aspects of the present invention is depicted in FIG. 20. FIG. 20 depicts a system for generating and distributing graphics-enabled email having advertisement image references that are resolved at the time of display of the email in accordance with at least one embodiment of the present invention. The system may include content/advertisement listing provider system(s) 16/24 that store and serve advertisements and an email provider 50 adapted to generate one or more emails having embedded advertisement image references rather than static text links. The graphics-enabled email can be generated using any of a plurality of formats, such as Hypertext Markup Language (HTML), Dynamic HTML (DHTML), Javascript, Perl, Common Gateway Interface (CGI), and the like.

In one embodiment, each advertisement image reference includes query string parameters that are used to identify the intended location of the advertisement image when displayed. Identifiers included in the query string parameters can include, for example, an identifier associated with the email (e.g., identifying the email as a "health" newsletter email sent on a certain date), a position identifier indicating the intended position of the advertisement image in the email display, and the like.

In one example, the email provider may generate an HTML-based email. In this example, the advertisement image may be stored at content/advertisement provider system 16/24 and associated with an identifier, such as a numeric or name identifier for the newsletter (e.g., 3614 or Sports or Parenting 56). The HTML-email may be generated with HTML-encoded content in any of a variety of forms and HTML that enables the operation of one or more image maps or images with corresponding target links. The HTML email may then be delivered to the email clients of some or all newsletter subscribers. Each HTML email may include images that present advertisements, including an embodiment in which a single image includes a plurality (e.g., three) advertisements with portion(s) of the image corresponding to each of the plurality of ads such that those portions may be selected. Upon selection, the end user's system may request a corresponding web page through a central server location at content/advertisement provider system 16/24, for example. In one iteration, the HTML image map may comprise a source image locator (e.g., URL of an advertisement image operated in affiliation with the content/advertisement provider system 16/24), HTML coding for designating a plurality of portions of the image and a plurality of target network-based locators corresponding to a portion of the image. An example of HTML coding to enable the image map to operate is depicted below:

<TR>
    <TD colSpan=6><MAP name=sgmap><AREA
        shape=RECT coords=0,0,600,20
        href="http://x.about.com/sg/r/3459.htm?p=0&
        ref=specsportss 1_sg"><AREA shape=RECT
        coords=0,55,600,75
    href="http://x.about.com/sg/r/3459.htm?p=11amp;
        ref=specsportss 1_sg"><AREA shape=RECT
        coords=0,110,600,130
    href="http://x.about.com/sg/r/3459.htm?p=2&
        ref=specsportss 1_sg"></MAP><IMG height=160
    src="http://z.about.com/sg/sg.gif?cuni=3459" width=600
    useMap=#sgmap border=0></TD></TR>

This section of code includes an image reference at src="http://z.about.com/sg/sg.gif?.cuni=3459", an indication of the image's height (160), its width (600) and an instruction to generate and use an HTML image map named sgmap.

The image map coding identifies portions of the overall image (e.g., AREA shape=RECT coords=0,55,600,75) and associates each portion with a target network-based locator (e.g., URL) that links back to content/advertisement listings provider 16/24 to be redirected to a web site or web page selected by a particular advertiser (e.g., href="http://x.about-.com/sg/r/3459.htm?p=0&ref=specsportss1_sg"). In this example, the image map includes references to three portions and three URL's differentiated by the "p" number (or position) in the image map. The various three references direct a user's system to request a web page at the advertising system (here, at host server x.about.com) that redirects the request to a web page selected by the advertiser associated with the corresponding portion of the image map as explained below with reference to FIG. 23.

Each advertisement in an image, in at least one embodiment, is associated with a URL reference. Accordingly, when a recipient of the email opens the email for viewing and "clicks" a portion of the image associated with the advertisement by the image mapping function, the email client interprets the HTML in the email and requests and displays the website referenced by the URL reference stored at the target site URL in the HTML email at that time. In one embodiment, as shown in the HTML coding above, the referenced URL may direct the email client to a server affiliated with the content/advertisement system 16/24, which in turn references a URL from the advertiser whose advertisement has been placed in the corresponding position in the image presented at the time of the selection. As discussed in greater detail below, in one embodiment, the actual website referenced by the URL reference is dynamically referenced at the time that the email is viewed by the email recipient rather than at the time of transmission of the email to the recipient.

In another embodiment, an advertisement section of the HTML email may be encoded to provide a plurality of images, each image comprising one or more advertisements. Therefore, the encoding described above for a single image map with three advertisement/portions/target network-based locators may be doubled, tripled, etc. to enable different numbers of advertisements/image maps. Also, the number of advertisements/portions/target network-based locators may be modified as desired. In addition, an image grouping may be based on a combination of single advertiser images and multiple advertiser image maps, with the grouping determined based on a revenue efficiency model, as described herein.

Also, an image may correspond to a single advertisement with a single target network-based locator and a plurality of such images may be utilized. Upon that HTML email being opened, each image in the grouping may be requested and the images provided may be based on the relationship available between advertisements for the specific distribution subject of the HTML email at the time of the email being opened.

After generating the email, email provider 50, in one embodiment, is adapted to transmit a copy of the email to the email clients of one or more intended email recipients over a network 14/22 (e.g., the Internet) using any of a variety of email protocols, such as Simple Mail Transfer Protocol (SMTP). Upon receipt, email clients (depicted by email clients 28e-28g although any number of different email clients may be provided) typically place the received email in an "inbox," where it is stored until the recipient directs the email client to open the email for display. It will be appreciated that the time period between the receipt of the email and the actual viewing by the email recipient can vary significantly. For example, one email recipient may view the email within minutes of receipt of the email, whereas other email recipients may allow the email to remain unviewed for hours, days, weeks, and even months.

Figure 21:
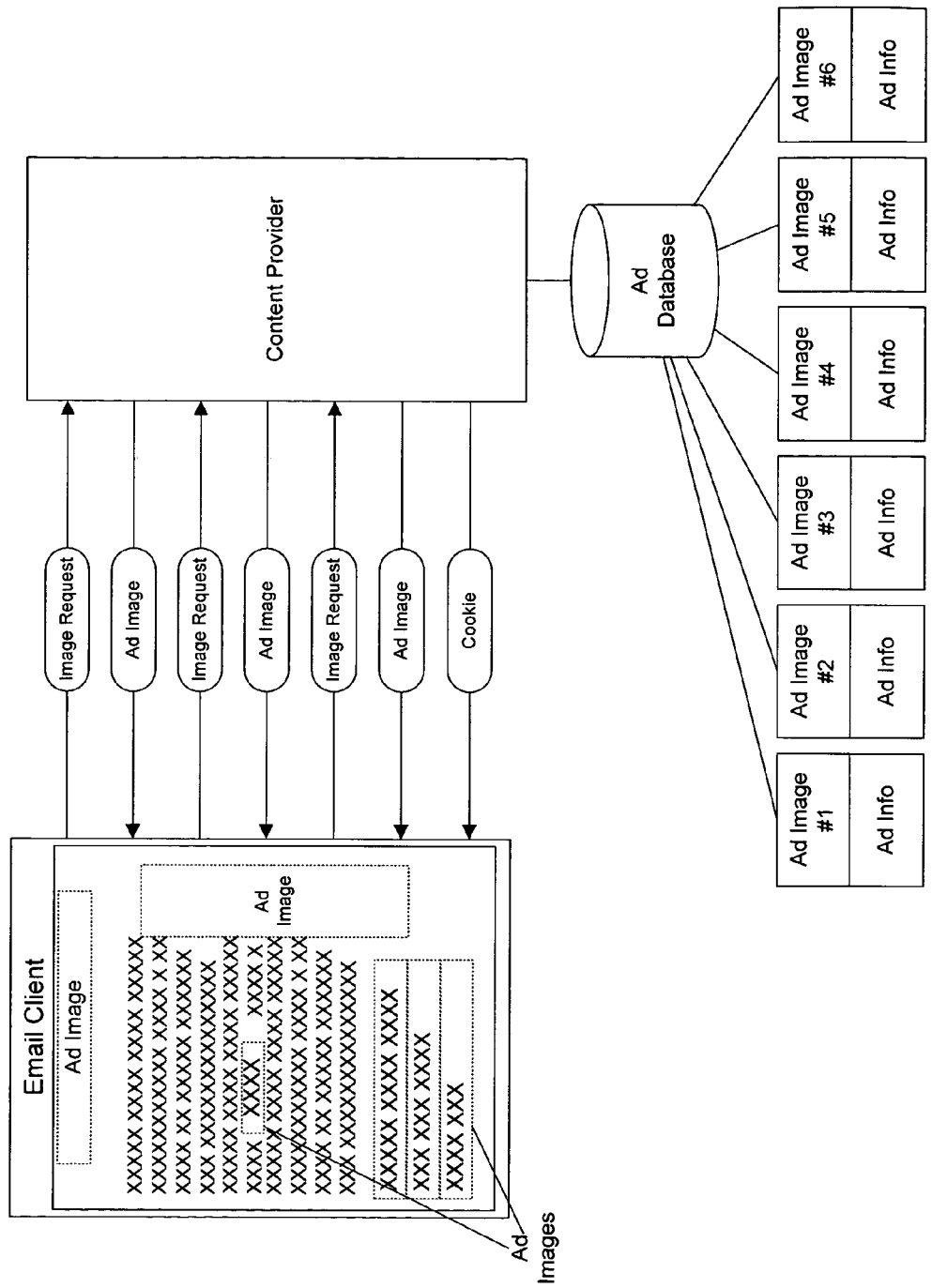
FIG. 21 depicts a system for dynamically selecting and displaying advertisement images in an email display according to an embodiment of the present invention.
Figure 22:
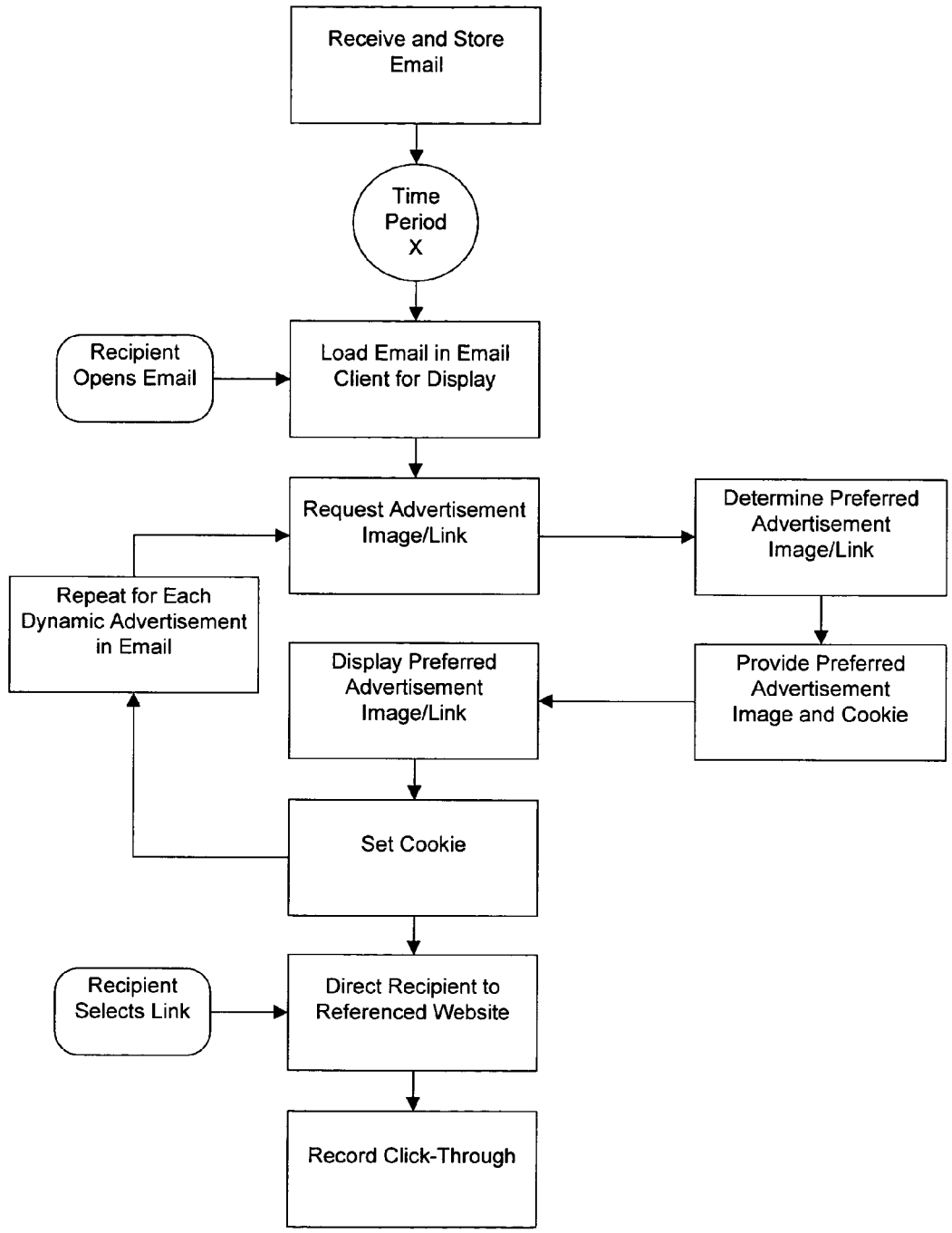
FIG. 22 depicts a method for dynamically selecting and displaying advertisement images in an email display according to an embodiment of the present invention.

FIGS. 21 and 22 depict a system and method for dynamically displaying pay-for-placement advertising in the email transmitted in FIG. 20 is depicted in accordance with at least one embodiment. In the illustrated example, the system includes a content/advertisement provider 16/24 adapted to dynamically provide advertisement images to email clients. The advertisement provider of FIG. 21 and the email provider of FIG. 20 may include the same provider or may involve different entities.

As noted above, the email generated by email provider 50 (FIG. 20) is transmitted to an email client 28 used by an email recipient and typically resides at email client 28 for a variable time period until the email recipient "opens" the email by directing email 28 client to display the content of the email. To display the email content, email client 28 typically utilizes an interpreter to interpret any instruction codes included in the file or data set representing the received email. For example, email client 28 may utilize an HTML browser to interpret and execute HTML commands embedded in the email; a Java plug-in to execute Javascript or Java applets embedded in the email; a Perl interpreter to interpret and execute Perl commands; and the like.

As described above, the email, in one embodiment, includes one or more image references that reference a location on context provider 16/24 to retrieve a graphical advertisement or graphical representation of a textual advertisement. Accordingly, when the email client prepares the email content for display, email client 28 uses the image references to request the corresponding images from content provider 16/24. Upon receipt of the image request, the content provider may be adapted to dynamically select an advertisement image (e.g., representing a pay-for-placement advertiser) and provide the selected advertisement image to the email client for display as part of the email display. The steps of selecting and providing advertisement images in response to requests for the images from the email client may be repeated until the email client has received and displayed all advertisement images referenced in the email. It should be appreciated that such steps may occur simultaneously to speed in the delivery time.

In at least one embodiment, the advertisements contained in the referenced image displayed as part of the email display are selected at the time the email is opened for display on the email client. The content provider can be adapted to select the advertisements in any particular image for display using any of a variety of factors. As mentioned above, in at least one embodiment, advertisers may place bids to have their advertisements placed in an email, and/or through other content delivery systems as explained below, where the bids preferably are based on click-throughs (e.g., the advertiser offers to pay $0.50 for each click-through to the advertiser's website resulting from an advertisement displayed in the email). When each advertiser submits a new advertisement for placement in an email, the content provider can be adapted to generate and store an entry in the ad database that includes the advertisement information, such as an advertisement image, an advertisement description (e.g., category keywords), the number of click-throughs already generated, bid information, and the like (more detail on embodiments of this aspect of the system is provided below). The entry also can include advertiser information (such as name, address, billing information).

Using the information stored in the ad database entries, the content provider can be adapted to select an optimum advertisement image in response to an image request from the email client. In one embodiment, the advertisement image can be selected based on bid value. For example, assume that ad #1 has a bid of $0.50 per click-through, ad #2 has a bid of $0.20 per click-through, ad #3 has a bid of $0.25 per click-through, ad #4 has a bid of $0.10 per click-through, ad #5 has a bid of $0.05 per click-through, and ad #6 has a bid of $0.30 per click-through. Accordingly, for a requested image to be displayed in the most prominent section of the email display, the content provider could select the advertisement image associated with ad #1. For a requested image to be displayed in the second most prominent section of the email display, the content provider could select the advertisement image associated with ad #6, and so on for the remainder of the image requests.

It will be appreciated, however, that the advertiser with the highest bid may not be the advertiser with the greatest number of click-throughs. Accordingly, rather than selecting advertisers for listing in the email solely on bid value, the content provider can be adapted to select advertisers for listing based in part on bid value in combination with the number of click throughs, as well as the relevance of the advertiser to the topic of interest of the email. For example, assume that ad #1 has a bid of $0.50 per click-through and an average of 20 click-throughs/day for the topic of the email (potential total of $10/day), ad #2 has a bid of $0.20 per click-through per click-through and an average of 100 click-throughs/day for the topic of the email (potential total of $20/day), ad #3 has a bid of $0.25 per click-through and an average of 10 click-throughs/day for the topic of the email (potential total of $2.50/day), ad #4 has a bid of $0.10 per click-through and an average of 250 click-throughs/day for the topic of the email (potential total of $25/day), ad #5 has a bid of $0.05 per click-through and an average of 5 click-throughs/day for the topic of the email (potential total of $0.50/day), and ad #6 has a bid of $0.30 per click-through and an average of 20 click-throughs/day for the topic of the email (potential total of $6/day). To maximize revenue, the content provider could select the advertisement image associated with ad #4 for a requested image to be displayed in the second most prominent section of the email display.

Moreover, the preferred set may be determined based on the optimum combined value of three advertisers set as a group. For example, it may be determined that a grouping of Ad #1, Ad #3 and Ad #5 generates the most revenue for content/advertising system 16/24 even though the bid values are not the highest individually.

The result set comprising the selected advertisement images and their intended position in the email display is referred to herein as the "preferred advertisement layout." In at least one embodiment, the content provider is adapted to store a representation of the preferred advertisement layout in the ad database at a particular date and time because the preferred advertisement layout is subject to change as bids and click-through rates change. Similarly, the content provider, in one embodiment, is adapted to set a browser cookie at the email client (or web browser), where the browser cookie includes a reference to the preferred advertisement layout and the date and time of the advertisement.

Should a email recipient select one of the displayed advertisement images, the email client, in one embodiment, sends a request to the content provider for the website referenced by the URL reference associated with the selected advertisement image within the image of the preferred advertisement layout. As with the advertisement image reference in the email, in one embodiment the associated URL reference is not directed to a particular advertiser's website, but instead is a nonspecific URL reference that can be used to identify a particular advertiser's website based on the context in which the URL reference was selected. In our earlier example, the nonspecific URL was http://x.about.com/sg/r/3459.htm?p=0& ret=specsportss1_sg. Accordingly, in at least one embodiment, the email client is adapted to include the reference to the preferred advertisement layout included in the browser cookie stored at the client earlier. Using this preferred advertisement layout, the advertising system 24 may identify the advertiser website associated with the selected advertiser image being displayed in the user's email client at that particular moment. The advertising system 24 then may provide the content of the advertiser website to the email client (or other web browser) for display as a "click-through." Once the content has been successfully displayed, the advertising system 24 may then record the click-through for billing purposes.

If the preferred advertisement layout for a particular newsletter changes, the image referenced in the email is changed along with the advertiser URL's related to each of the non-specific URL's stored in the database in association with the image. Therefore, without having to modify any code stored in the email on the email client, different advertisements may be displayed dynamically to the user as the preferred advertisement layout changes.

Moreover, as a result of requesting the current image containing the preferred advertisement layout when the email is opened each time, advertisers or advertisements that are stale or no longer participating are not displayed. Such advertisers thus do not get "free" referrals and the advertisement system does not lose out on an opportunity for revenue from the click-through to a no-longer-participating advertiser.

The content/advertisement system 16/24 may comprise a number of components, as shown below with reference to FIG. 2, for example. In particular, relevant to the operations described above, an ad image generation module 42 may be provided to generate an image comprising portions related to one or more (preferably a plurality) of advertisements, such as an image shown in FIG. 23, described below. The functionality for generating an image may comprise computer software that takes data from a database into an image form to prepare a completed image. Other software may also be used. In addition, an image server 44 may be provided to receive requests for images from a database and may retrieve images upon request at a specific network-based locator (URL) and variables specifying which image is to be supplied. The image supplied may be based on the variable which is used to index and retrieve an image from database 18.

Also, a target redirection server 46 may be provided to receive a request for a web page upon selection of a portion of an image corresponding to an advertisement. The target redirection server 46 may receive a request at a specified network-based location and use the parameters to determine the corresponding advertiser.

To provide the functionality of elements 42-46, database 18 may store images and target websites all indexed to a specific distribution subject identifier, such as a number or name. Ad listing generation module 32 may intermittently (based on time, new bids, changes in bids, etc.) update the order of ranking of advertisements for a specific distribution subject and therefore, update the image to be provided and the advertisement URL's (including changing the position of the URL's based on re-ordering that may occur) to which target redirection server 46 may redirect the email client when the corresponding advertisement is selected.

Specifically, the flow of steps depicted according to one method of the present invention is shown in FIG. 22. In the first step 2202, a recipient receives and stores the electronic document (e.g., HTML email) that contains html encoding specifying at least one reference to an image at the content/advertising system. Next, in step 2204, a time period designated with the letter X takes place. As indicated above, the period of time is unknown and therefore any period of time may elapse between the user receiving and storing the email and the next step, step 2206 of the recipient opening the email. Upon opening an email, in step 2208, the email client 28 may load the email and interpret the coding of the email, including the reference to an image stored at the content/advertising system 16/24. At that point, the email client may initiate step 2210 to request the advertisement image/link stored in the email. As indicated above, an email newsletter may contain one or more such references to images that will be stored at the advertising system 24.

Step 2214 may occur at the advertisement system 24 to determine the preferred advertisement image associated with the reference received from the email client. As indicated above, because the preferred combination of advertisers in a single image may change, this is done dynamically and at the time of the request. So, for example, based on the numeral or name designator, a specific image may be generated. Once the correct image has been determined, in step 2214, the advertisement system 24 may transmit the advertisement image back to the email client for display to the user in step 2216. In addition, the advertising listing system 24 may deliver a cookie to the email client to be stored on the email client's computer in step 2218. As discussed above, the cookie may contain a number of pieces of information, including an indication of time and date placed and the various information about the image and the image map delivered to the user. In step 2220, it is determined whether each dynamic advertisement in the email has been received and if so, the process of steps 2210, 2212, 2214, 2216 and 2218 are repeated. If all such advertisements have been displayed, then in step 2222, a recipient may select one or more of the links depicted within the image delivered to the user in step 2222. Specifically, the image may display what appears to be links, although each is actually a portion of the image map that may be selected as depicted above in the illustrated image map example. If the recipient selects a link, then in 2224 the email client transmits a request back to the advertisement system at the URL specified in the image map coding as discussed above. And at that point, in step 2224, the user is re-directed to an advertiser associated with the portion of the image map that the user selected. In addition, for purposes of recording click-throughs and other database recordation techniques, in step 2226, the click-through is recorded.

Figure 23:
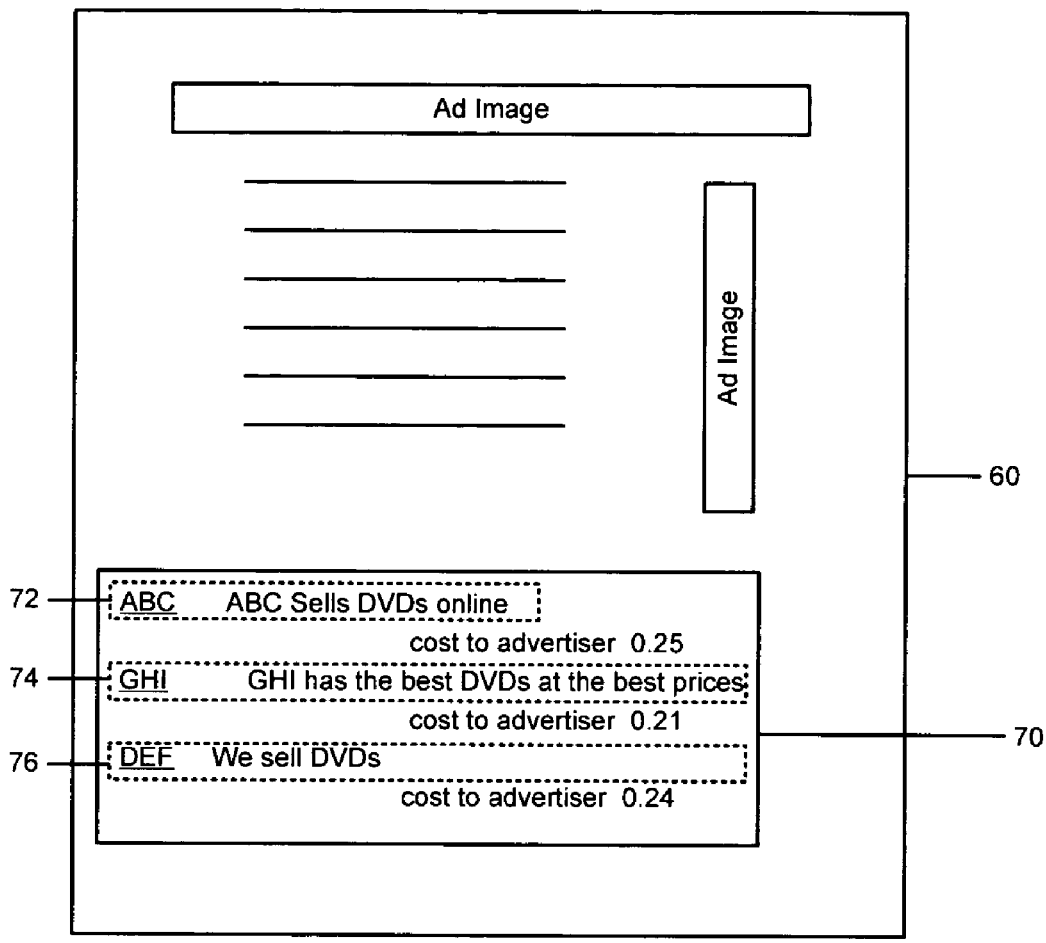
FIG. 23 depicts a presentation of an electronic document with content and images for dynamic display according to an embodiment of the present invention.

An example of an email advertisement and the associated click-through portions may be shown in FIG. 23. In this figure, the advertisement 60 may comprise a number of portions including textual content typically provided in email newsletters. In addition, various advertisement images may be included. In this example, several are depicted, but one is described in greater detail for purposes of illustrating how the image map function may work. Here, one of the advertisement images 70 may comprise three specific advertisements for different makers of DVD systems or DVD sellers. Here, each of the three advertisements may be displayed as part of a single advertisement image 70 but may have a portion of the image depicted as elements 72, 74, and 76 allocated for display of an individual advertiser.

Here, the advertisers have been selected based on a grouping that is determined to generate the most revenue for the advertising system: the first advertiser has bid 25 cents per click through, the second 21 cents per click through, and the third 24 cents per click through, but this combination is better than the combination in which one of the advertisers may bid 26 cents per click through, for example. Here, an underlined portion is depicted to show the user that they may select that portion of the image to link through to information about that particular advertiser. As described above, upon selecting a portion of the image map, a URL associated with that portion is activated by the email client, redirected back to the advertising listing system and then directed from there to the advertiser ABC, for example, associated with this particular advertisement.

As will be appreciated, whereas the current grouping of ABC, GHI, and DEF may be the present arrangement of advertisers for this particular email newsletter, in one week from now, it is possible that ABC will stop participating in advertisement through the advertising listing system. Accordingly, if the present image were delivered each time the user opened the email, it is possible that the user will be redirected to a web site for ABC and ABC would thus not have to pay or that there would be a "broken link" when requesting information from ABC. The present system as described above prevents that situation by delivering the image each time the email is opened so that each of the advertisers included in the image are active advertisers that are participating in the system and to which the advertising listing system has an active link for redirecting users requesting further information from that advertiser and therefore are capable of generating the revenue from the click through arrangements as described in greater detail below.

As noted above, any of a variety of techniques may be implemented by the content provider to select advertisements for listing in graphics-enabled emails transmitted to email recipients. In particular, FIGS. 1-19 depict a system and method for generating a ranking of advertisements based on revenue efficiency over given periods of time in accordance with at least one embodiment of the present invention. Although the following describes various embodiments for ranking advertisements for pay-for-placement advertising in the context of an Internet website, those skilled in the art can readily adapt the following for use in ranking advertisements for placement in graphics-enabled emails, using the guidelines provided herein.

Figure 1:
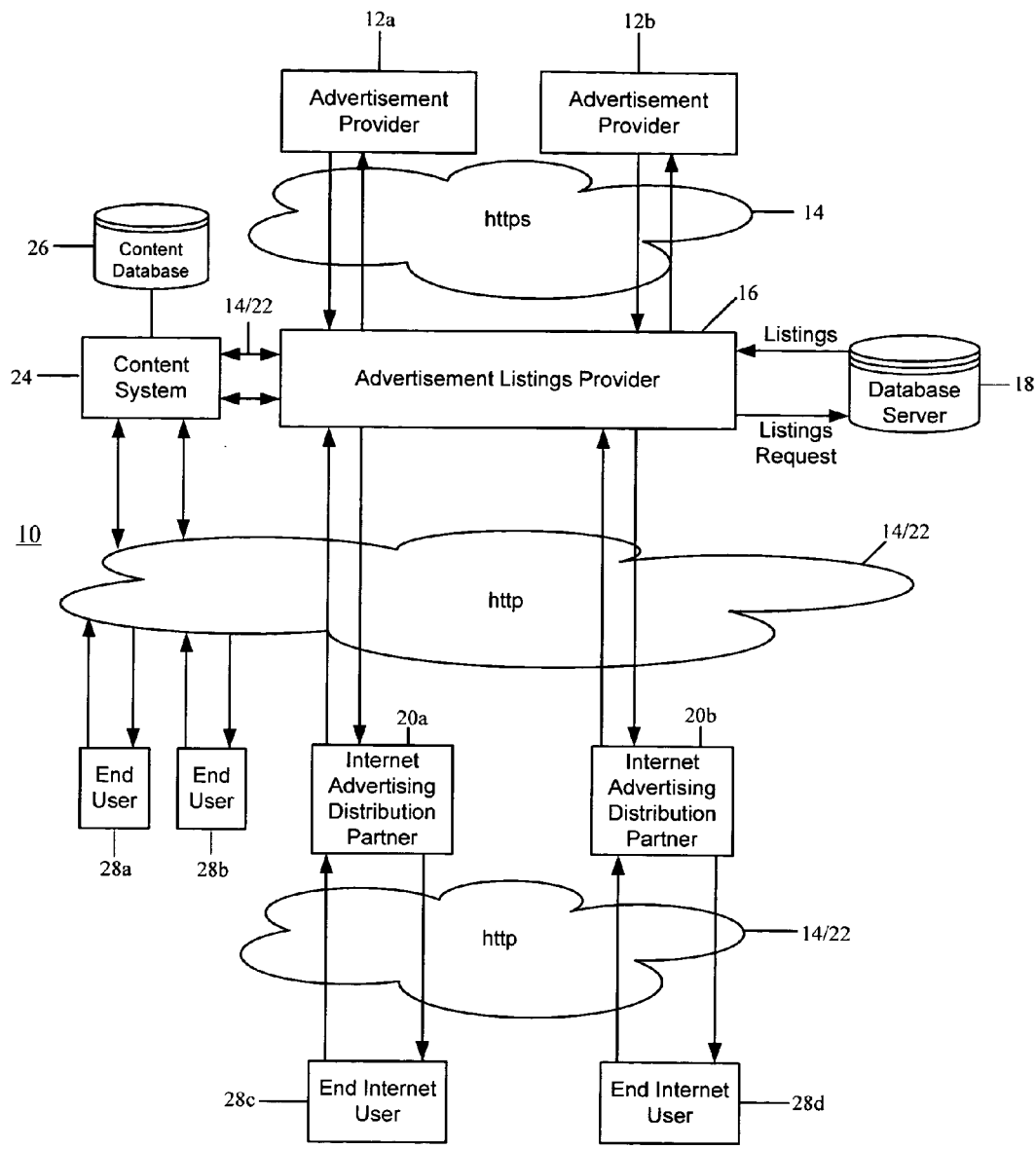
FIG. 1 depicts a system for distribution of advertisements based on an optimized efficiency-based ranking methodology for a bid-based advertisement system according to an embodiment of the present invention.

An embodiment of a networked environment in which such a system may operate is depicted in FIG. 1. In such a system, advertisement providers 12 connect over a network 14 to an Advertisement Listings Provider 16 (e.g., using a secure https connection) to register, provide payment information, bids and associated advertisements (also called creatives) associated with the bid. For example, the advertisers may provide its bid in association with a keyword for use in a search engine system and may also provide a bid in association with content on a content portal. The Advertisement Listings Provider 16 then stores the information on a database server 18 for later transmittal. The Advertisement Listings Provider 16 may then distribute the listings through various forums or feeds, including providing the listings on one or more web sites affiliated with the Advertisement Listings Provider, through Internet Advertising Distribution Partners 20 (connected over network 14 or 22 depending on security desired), through Content Systems 24 (with associated content databases 26) and through Search Engine systems operated by the Advertisement Listing Provider or Internet Advertising Distribution Partner(s). Through these various forums, the advertisements provided by the advertisement provider may be included in pages displayed to end users 28 (often called an impression). In one embodiment, the advertisement provider 12 is only obligated to pay for the impression if the end user clicks-through the advertisement to the web page target provided by the advertisement provider in affiliation with the particular ad. In addition, the Advertisement Listings Provider 16 may only be paid when a click-through occurs. Also, traditionally, the Advertisement Listing Provider 16 and Internet Distribution Partner(s) 20 may agree to share the revenue for the click-throughs generated through distribution via the Internet Distribution Partner 20.

Each of Advertising Listings Provider 16 and Advertisement Provider 12 may comprise computerized systems that include one or more of the following systems: a web server, a database server, proxy server, network balancing mechanisms and systems, and various software components that enable the system to operate on the Internet or other network type system. Additionally, networks 14 and 22, although depicted as http networks, may comprise other networks such as private lines, intranets, or any other network. Preferably, the connection between advertising provider 12 and advertisement listing provider 16 may comprise secure network connections to insure that data is not subject to attack or corruption by any hacker or other third party. In addition, whereas two advertisement providers are depicted, it should be appreciated that one or more advertisement providers 12 may be provided in the network. Similarly, although one database server 18 is depicted, it should be appreciated that multiple database servers may be provided and that such database servers may be connected to the advertisement listing provider via any type of network connection, including a distributed database server architecture. Similarly, content system 24 and content database 26 may comprise any number of such systems connected to the advertisement provider or advertisement listing provider 16 via any type of network, including an http or https network. Content provider 24 may comprise a system such as advertisement listing provider 16 that provides functionality for enabling connection over the Internet or other network protocols. End users 28 may comprise any user connected to the Internet and may comprise computerized systems that enable that connection through any of various types of networks, including through Internet service providers, cable companies, and any other method of accessing data on the Internet. Internet advertising distribution partners 20 may comprise any system that distributes Internet based advertising to end users. Whereas two Internet advertising distribution partners 20 are depicted, any number may actually be provided.

In general, in these embodiments, the Advertisement Listing Provider 16 generates revenue when end users click-through to advertisements provided by its bidding advertisement providers. The Advertisement Listing Provider 16 may also incur costs for every impression that it reaches in the form of overhead in running a web site or distribution agreements for distribution. Accordingly, the various embodiments of the present invention recognize that in such systems, it is revenue efficiency (click-throughs per impression) that generally produces the Advertisement Listing Provider's profits. By using revenue efficiency to rank advertisements then, the Advertisement Listing Provider's rankings track its own profitability. This is particularly true for distribution channels with limited numbers of slots for advertisements. For example, the assignee of the present invention operates an enterprise known as Sprinks that distributes advertisements through another enterprise known as About.com and many others. Within each web page offered on About.com, About.com has allocated space for five advertisements from Sprinks that are provided by bid-based advertisers that use the Sprinks system. With only five spaces for advertisements, it is in Sprinks' interest to ensure that each of those five advertisements is effective.

Figure 2:
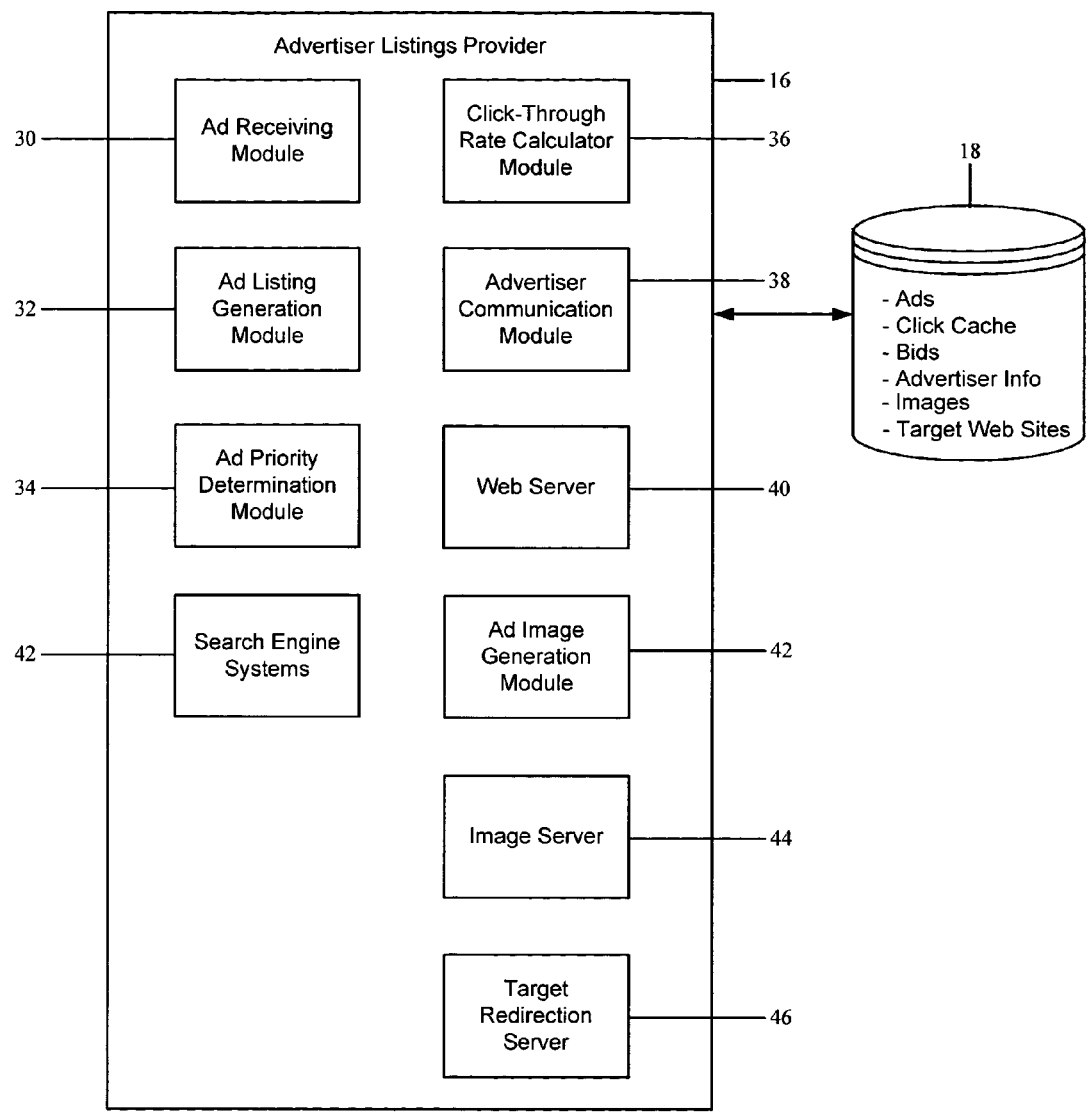
FIG. 2 depicts an advertiser listings provider system and database for use in the system of FIG. 1 according to an embodiment of the present invention.

As shown in FIG. 2, the Advertising Listing Provider 16 may comprise a system that provides an advertisement receiving module 30 for interacting with advertising providers to receive advertisement information. It may also comprise an advertising listing generation module 32 that generates a listing of advertisements from the database based on criteria provided and depending on the forum for the advertisements (e.g., search engine, content portal, distribution partner, etc.). An advertising priority determination module 34 may generate an order to the listing based on rankings based on a model. In one embodiment, the advertising priority determination module 34 may determine rankings based on revenue efficiency and utilize a click-through-rate determination module (also called a Click-Through-Rate Calculator). The resulting advertisements generated and ranked may then be communicated through various channels. An advertiser communication module 38 may also be provided for communicating with the advertisers. For example, it may be desired for the system to alert an advertiser prior to changing the advertisement used for a given bid or before moving the advertisement down or up in the rankings. A database 18 may be provided in affiliation with the advertiser listing provider to store advertisements, bids, advertising information and a cache of clicks to be used to determine the click-through-rate.

Additionally, because Advertising Listings Provider 16 may provide the functionality of distributing advertising itself and providing search engine results, web server system 40 may be provided as well as a search engine system 42. It should be appreciated that multiple such systems may be encompassed within the advertising listing provider system 16.

Additionally, database server system 18 may comprise one or more database systems that store various types of data including one or more of the following: advertisements, the click cache, bid amount information, and advertiser information including registration information about the advertisers, accounts for the advertisers, payment information and other information as described herein. Numerous modules may not be provided in various embodiments and/or the modules may be combined together to provide the functionality described. Further, the modules may be dispersed across multiple physical systems or may be duplicated across multiple systems.

FIGS. 16-19 illustrate various examples of the way in which the Advertising Listing Provider system may implement the revenue efficiency ranking methodology. As shown in FIG. 16, for a given keyword, the advertiser listing provider may have many different advertisers that have bid on that keyword for placement in search results from a search engine implementing a bid-for-placement system. Over a period of time or number of impressions, the advertising listing provider system may monitor and store click-through rates for the effective advertisement for a given advertiser. For example, for every 1000 impressions, it may be determined that the primary advertisement provided by higher bidder on the keyword "DVD" generated a 20% click-through rate. Based on its bid of $0.25 per click-through, that rate generated a revenue per thousand (RPM) of $50.00. Similar data may be tracked for other advertisers that bid on the keyword DVD, including advertisers whose secondary advertisement were already implemented to increase efficiency such as the advertiser JKL, Inc. in FIG. 16.

After determining the RPM for each advertiser, the advertiser listing provider may then take an action, including re-ranking the advertisers for the keyword DVD based on RPM. In this example, several lower bidders may be moved up in the rankings because of their relatively high click-through-rate, indicating the relevancy of their bids. Thus, the system monitors and changes the rankings of advertisements for a given keyword based on RPM. This monitoring and reevaluation of rankings may be ongoing and using different periods of time. For example, click-through rates may be monitored hourly, weekly, monthly, etc.

Taking this example, rankings may also be determined by the system for placement in content portals. For example, instead of bidding on the keyword "DVD," the advertisers may be bidding on a page within a content portal about DVDs. In such a system, a limited number of advertisers may be displayed within that page, as shown, for example, in FIG. 18. Based on the new rankings, then the order or placement of the advertisements in the page may be ABC, GHI and then DEF due to the RPM rates of those three advertisements even though ranking by the bid amounts would have yielded a different result.

Also, as discussed above, the monitoring of RPM may also involve the selection of an active advertisement from a plurality of advertisements provided by an advertiser for a given bid. FIG. 17 depicts a table that indicates a determination that may be made by the advertiser listing provider system regarding multiple advertisements provided by a single advertiser for a given bid. Two examples are provided. In the first example, an advertiser ABC, Inc. has bid on the keyword "DVD" and provided four different advertisements. Over a given time period, the RPM is determined to be higher for Ad #3 and therefore, Ad #3 may be determined to be active ad that is displayed in the ranked listings for ABC's bid on the keyword DVD. To evaluate alternative ads, the four different ads may be run at different times, periods, etc. in an attempt to give each ad an opportunity to be viewed by a statistically significant number of viewers and in the relevant time periods. It is possible that alternative ads may not be used until the click-through rate for a given ad begins to decrease. Or, alternative ads may be displayed for a few hours each week with the active ad being used the rest of the week. In that way, alternative ads may be constantly supplied by the advertiser to see if the alternative ad is more effective than the current active ad, but without significant impact if it is substantially worse than the active ad. In other words, an incentive may be provided for the advertiser to try alternative ads that may generate more revenue and more traffic to the advertiser but without the potential penalty of losing ranking against competing advertisers. For example, the alternative advertisement click-through rate may be excluded from the overall advertisement rate when used for comparison against other bidders.

Similarly, the advertiser DEF, Inc. may have provided two advertisements for its bid on the content pages at pregnancy.about.com. After an evaluation period between the two advertisements, it may be determined that Ad #1 was still the most effective based on RPM and therefore, may continue to be used as the active advertisement.

In addition, the comparison between multiple advertisements may be evaluated over different time periods to determine the highest RPM over different time periods. FIG. 19 depicts an example of a table that may represent the determination made by the advertising listing provider system in which different time periods within a single day are evaluated. As this example illustrates, it is possible for different advertisements to be more effective on a RPM basis at different times of the day. Accordingly, the advertisement selected for a bid may be based on RPM and selected time periods.

Other data may be factored into the evaluation to determine rankings based at least in part on revenue efficiency. Demographics of the audience, distribution channels, country, and other information that is available may be fed into the calculation to assist in maximizing the RPM for advertisements for bid-on keywords and content portal pages. For example, it may be determined that the ranking should generate different ranked listings for different distribution channels.

According to another embodiment, advertisements may be analyzed in groupings. The groupings may be based on the known result set expected by a particular distribution channel. Accordingly, the groupings may be analyzed separately for each distribution channel as well, with different distribution channels thus receiving a different order and listing of advertisements optimized to generate revenue through that channel. For example, one distribution channel may be a result set expected to be output for a content portal page. In such an embodiment, a set number of listings may be expected and the system of the present invention determines the most revenue-efficient combination of listings based on effective revenue per click for the grouping, varying the members of group over time to determine that most effective grouping. For explanation purposes, assume that there are only four Ads (A,B,C,D) for a given keyword (video games) of which only three listings are to be displayed on the feed (in this example the content portal page). In this example, advertiser B has provided two creatives, B1 and B2.

To decide the most efficient grouping, the system outputs each of the different combinations over a set period of time and determines the effective CPM Sum (cost to advertiser (and thus revenue to the advertisement distribution system) per thousand impressions) for each model. The various combinations are then: AB1C, AB1D, ACB1, ACD, ADB1, ADC, B1AC, B1AD, B1CA, B1CD, B1DA, B1DC, CB1A, CB1D, CAB1, CAD, CDB1, CDA, DB1C, DB1A, DCB1, DCA, DAB1, DAC, AB2C, AB2D, ACB2, ACD, ADB2, B2AC, B2AD, B2CA, B2CD, B2DA, B2DC, CB2A, CB2D, CAB2, CDB2, CDA, DB2C, DB2A, DCB2, DCA, and DAB2.

The Effective CPM Sum for each model may be calculated by summing the CPM (calculated by the equation 1000*Click-Through-Rate*CPC (cost per click)) of each listing.

If model CB1A yields this:

| Unit | CTR | CPC | ECPM |
|------|---------|-----|-------|
| C | 0.00151 | .42 | .6342 |
| B1 | 0.00145 | .43 | .6235 |
| A | 0.00148 | .36 | .5328 |

Then the Effective CPM Sum is:
CB1A 1.7905
If model CB2A yields this:

| Unit | CTR | CPC | ECPM |
|------|---------|-----|-------|
| C | 0.00151 | .42 | .6342 |
| B2 | 0.00149 | .43 | .6407 |
| A | 0.00148 | .36 | .5328 |

Then the Effective CPM Sum is:
CB2A 1.8077

This would indicate that CB2A is superior to CB1A.

Through this embodiment, ads are not compared to one another in isolation, but rather in the grouping that generates the most revenue. This embodiment recognizes that diversification of advertisements may generate more revenue due to the diverse interests of viewers. For example, a web page on a content portal related to video games may attract viewers that have many different game platforms. If all of the advertisements relate to sales of games only compatible with a single platform, the grouping may lack any advertisement of interest to the viewer.

Figure 15:
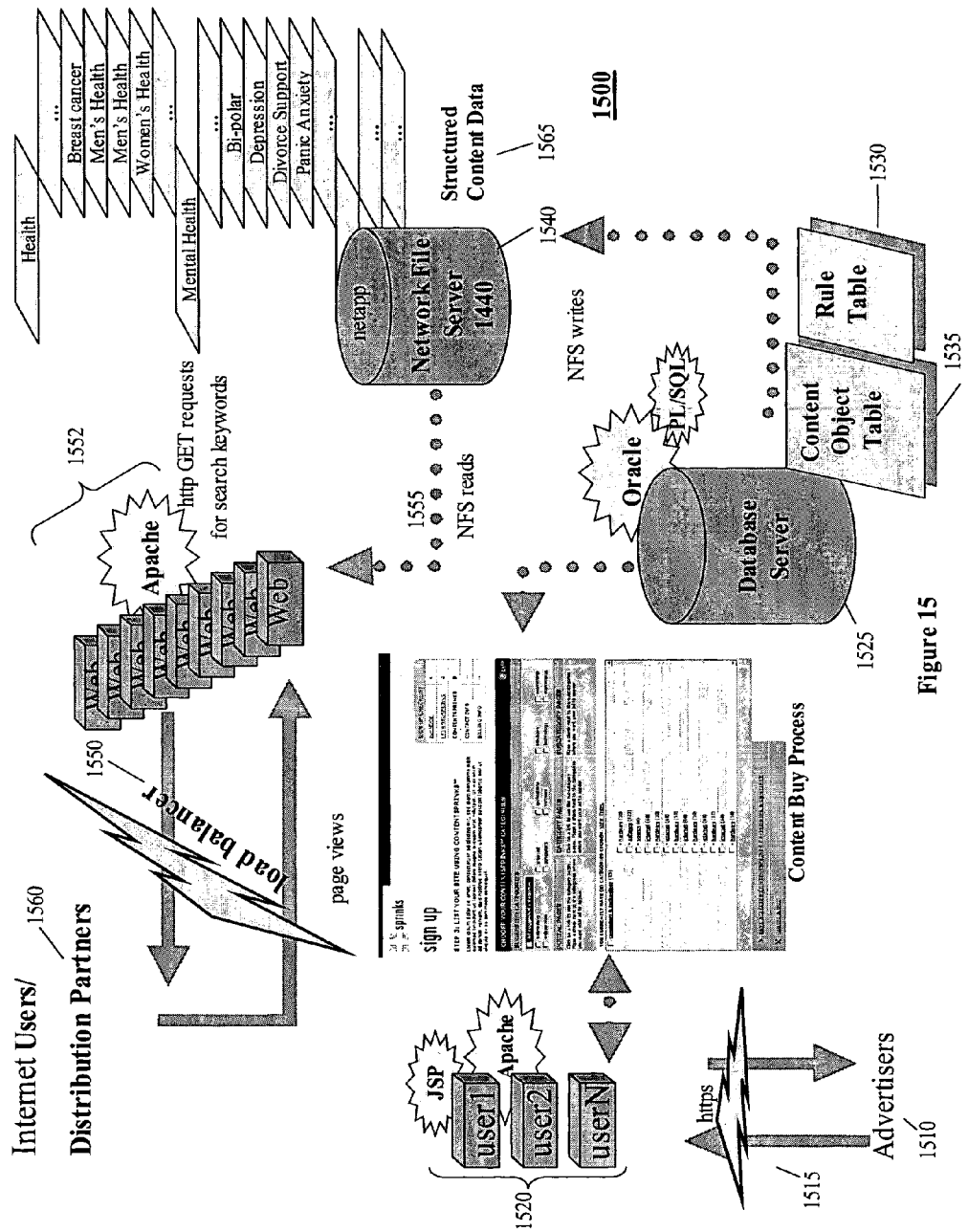
FIG. 15 depicts a schematic diagram representing a system whereby an advertiser may list advertisements in subject matter specific nodes within a structure of subject matter specific nodes according to an embodiment of the present invention.

To enable advertisers to interact with the system, a web-based Internet system may be provided as shown in FIGS. 1 and 15, for example. In such an embodiment, Advertisement Providers 12 submit their advertisement listings to the Advertisement Listings Provider 16. It is understood that any number of Advertisement Providers 12 may submit advertisement listings to the Advertisement Listings Provider 16. Advertisement listings may include all or part of the following information fields: the name of the Advertisement Provider, a title of the advertisement, a description of the goods or services advertised, a URL to be displayed in the listing, a where an end user will be directed upon clicking on the advertisement, contact information, an email address, billing information, pricing information, and an advertisement identification number. In one embodiment of the present invention, the Advertising Listing Provider 16 ranks the advertisement listings submitted and stores the ranked listings in a Database Server 18. According to a specific embodiment, the rankings are generated based on an efficiency-based model as described above.

As discussed above, various embodiments of the present invention may be utilized in an advertising system based on content-based placement. An embodiment of a content-based placement system in which this efficiency-based ranking methodology may be utilized is described in a related patent application entitled "Method and System For Providing Advertising Through Content Specific Nodes Over the Internet," Application No. 60/396,033 filed on Jul. 18, 2002. For completeness, a description of the operation of such a system is provided below, as modified to incorporate the provision of multiple advertisements by a single advertiser for the single-advertiser efficiency determination methodology as described above. This system is described in the context of FIGS. 3-15 below. It should be appreciated, however, that other systems for enabling input of advertisements may be used as well within the scope of the present invention.

FIG. 3 depicts a graphical user interface 300 that enables a user to "sign up" according to an embodiment of the present invention. A user desiring Internet advertising may access the system via a secured Internet connection. This embodiment depicts the process for a single user desiring Internet advertising to sign up, however, any number of users may access the system to purchase content node advertising. FIG. 3 shows the instigation of the process with the creation of a username and password to create a safe and secure system. There are other ways to accomplish the security aspect of the present invention, such as direct network connections, or subsequent verification by the user desiring Internet advertising.

FIGS. 4(a)-(b) depict graphical user interface 400 that enables a user to list an advertisement on the Internet associated with a search term according to an embodiment of the present invention. As shown, a user may be provided with multiple graphical user interfaces, one each for each advertisement associated with a specific bid. It is also possible to provide a single graphical user interface to enable input of multiple advertisements corresponding to a bid. In one embodiment, the graphical user interface provides inputs for a general search term 402, representing the high level subject matter corresponding to the desired advertisement. Furthermore, the user desiring advertising may enter a listing title in input 404. The listing title represents the title the user desiring advertising wishes to display on the advertisement. For example, if the user desiring advertising wishes to sell video games manufactured by a company under the name of "V-G" the listing title may be "V-G video games" or "V-G video games for sale" or other descriptive alternates. The user desiring advertising may also input a display URL in input 406, which may represent the location of the general website for the click through. For example, the V-G user may input a display URL of www.v-g.com. Additionally the user may input a targeted URL in input 408, which represents the actual URL of the site the end-user will be directed to if they click on the advertisement. This may be different from the display URL, for example, in that it directs the end-user to a particular model of video game on sale (e.g., www.v-g.com\modeV52.html). Also, only a single URL may be input and the displayed URL may be the URL of the site to which the end-user may be directed by clicking on the advertisement. In this embodiment, the user desiring advertising may also input a description of the goods or services being advertised in input 410. Further, the user desiring advertising may submit a price in input 412. In an embodiment of the present invention, the pricing of the advertisements is accomplished via a bidding system. Each proposed advertisement listing has a bid price associated with it. In this embodiment, the listings are subsequently listed in descending order of bid prices for the specific level being displayed. The prices may be a per click through price or a flat rate, or as discussed above, a RPM ranking. The proposed listing end user may view the proposed listing in the proper order when the end user searches the web site for the search term or terms.

FIG. 5 depicts a graphical user interface 500 that enables a user to confirm listing an advertisement on the Internet associated with a search term according to an embodiment of the present invention. This graphical user interface allows the user desiring advertising to see what position their add would hold in the descending order of advertisements based upon the pricing previously submitted. In a RPM system, the ranking shown may be based on the price bid initially or may be based on the overall average click-through-times-bid amount, for example. If the user desiring advertising is not satisfied with the rank shown, or otherwise desires to adjust the rank of the listing, the user may accomplish this by choosing the edit button associated with that particular listing.

FIG. 6 depicts a graphical user interface 600 that enables a user to select a channel level node when listing an advertisement on level nodes according to an embodiment of the present invention. In this step the system may use the search terms previously entered to suggest document level nodes. This option may be accomplished under "Choose Categories Based Upon Keyword." Also, the user desiring advertising may specify a category appropriate to the goods or services advertised under Channel Level Nodes. Changing examples, if the advertiser was a breast pump manufacturer, the advertiser may select "Parenting and Family" as the Channel Level Node. The screenshot shows sample general subject matters. This list is not meant to be all inclusive. Any other subject matter topic may be appropriate.

FIG. 7 depicts a graphical user interface 700 that enables an advertising user to select a subject level node when listing an advertisement on level nodes according to an embodiment of the present invention. In this graphical user interface, the system may use the search terms previously entered to again suggest document level nodes. This option may be accomplished under "Choose Categories Based Upon Keyword." Also, the user desiring advertising may specify a category appropriate to the goods or services advertised under Subject Level Nodes. Continuing the example of the breast pump manufacturer desiring advertising, the user may select "Pregnancy/Birth" as the Subject Level Node. The graphical user interface of FIG. 7 provides an example of subject level nodes. This list is not meant to be inclusive. Any other subject matter topic may be appropriate and is preferably more specific than the subject matters listed as channel level nodes. The listing options that appear under the subject level nodes depend upon what selection the user desiring advertising made under the channel level node.

FIG. 8 depicts a graphical user interface 800 that enables a user to select a document level node when listing an advertisement on level nodes according to an embodiment of the present invention. In this graphical user interface, the system may use the search terms previously entered to suggest document level nodes. This option may be accomplished under "Choose Categories Based Upon Keyword." Also, the advertisement provider user may specify a category appropriate to the goods or services advertised under Document Level Nodes. Continuing the example of the breast pump manufacturer desiring advertising, the user may select "Breastfeeding" as the Document Level Node. The graphical user interface 800 provides an example of general subject matter nodes. This list is not meant to be all inclusive. Any other subject matter topic may be appropriate, and preferably is more specific than the subject matters listed as subject level nodes. The listing options that appear under the document level nodes depend upon what selection the user desiring advertising made under the subject level node.

FIG. 9 depicts a graphical user interface 900 that enables an advertising provider user to confirm listings according to an embodiment of the present invention. If listings appear that the user desiring advertising does not wish to purchase, the user may so indicate such as, for example, by unchecking the corresponding box.

FIGS. 10(*a*) and (*b*) depicts graphical user interfaces 1000 and 1050 that enable a user to enter detailed listing information for various advertisements corresponding to the level-node content bid entered. In one embodiment, this step is individually accomplished for each desired document level node listing. For example, in FIGS. 10(*a*) and (*b*), two different alternative ads are provides, so the node-based ad is provided for each separate bid—one in graphical user interface 1000 and one in graphical user interface 1050. In one embodiment, the relational structure of the nodes chosen is represented in the listing name shown at the top of the graphical user interface 1000 and 1050. The user may then input a listing title, a display URL, a targeted URL, a description and a price in input areas 1002, 1004, 1006, 1008 and 1010, respectively.

FIG. 11 depicts a graphical user interface 1100 that enables a user to confirm bids to list an advertisement on different level nodes within a given content portal according to an embodiment of the present invention. Once user has provided inputs in the GUI 1000/1050 for each desired document level node listing, the listings may be displayed in GUI 1100. Along with the information input by the user desiring advertising, the system may also display the rank the user would occupy with the price previously submitted for each listing. This GUI 1100 enables the advertiser to gauge its potential response by its ranking. For example, the breast pump manufacturer would likely be willing to pay more to be listed first on the breast feeding document level node, than on the pregnancy document level node. An end-user accessing documents related to breast feeding is more likely to be in the market for a breast pump than any given end-user accessing pregnancy, in the mind of the advertiser. Thus, the advertising user has bid more to achieve the first position in that breast feeding document level. If the user is not happy with the rank and bid amounts, the user may edit the listings.

FIG. 12 depicts a graphical user interface 1200 that enables an advertising user to provide contact information according to an embodiment of the present invention. This contact information may include any or none of the following information relating to the user desiring advertising: first name, last name, company name, street address, city, state, zip code, country, email address, phone number, fax number, and industry through inputs 1202, 1204, 1206, 1208, 1210, 1212, 1214, 1216, 1218, 1220 and 1222, respectively. In other embodiments any number of other pieces of information regarding the user desiring advertising may be requested in this step.

FIG. 13 depicts a graphical user interface 1300 that enables an advertising user to provide billing information according to an embodiment of the present invention. In one embodiment, the advertising user may enter a credit card or other financial account information that would enable automatic periodic billing by the system in input area 1302. In other embodiments, the system may periodically generate physical invoices, which are mailed to the advertiser. FIG. 13 shows an option where the user may choose to enable "account auto replenish" in input 1304. This feature allows the system to charge the user before any advertising expenses are actually incurred. The system charges a preset amount to the user's billing card whenever the user's account balance falls to a certain amount. In this step, the user may also input their billing address in input area 1306.

FIG. 14 depicts a graphical user interface 1400 that enables a user to register an account to list an advertisement on level nodes according to an embodiment of the present invention. This graphical user interface represents an opportunity to make changes to the listings, contact information, or billing information prior to the listing becoming live. Once the advertising user takes this step and registers the listings, the advertisements are then placed according to their node structure on the appropriate document level listings.

FIG. 15 is a schematic diagram representing an advertisement system 1500 whereby an advertiser is enabled to list ads on content specific pages according to varying levels of subject matter specificity, such as through the various embodiments depicted and described above. Multiple advertiser systems 1510 may connect to the Internet via an http connection 1515 and access the advertisement system through servers 1520. The http connection 1515 may be a secure one (https), if desired, although other security measures may also be utilized, such as described above. An advertiser system 1510 may access a database 1565 of content specificity via a database server 1525. Database server 1525 may provide software operations to interactively provide the graphical user interfaces presented in the example embodiments above, receive content from those graphical user interfaces, store the content into the database and then provide subsequent error messages, or appropriate confirmation messages. Database server 1525 may also sequence the pages to the user based on pre-determined relationship(s) between the graphical user interface pages shown. One example of how this may be accomplished is through the database server reading and writing to a Content Object Table Database 1535 where advertisements associated with content may be stored. Furthermore, database server 1525 may enable the advertiser to read the Rule Table Database 1530, which may provide artificial system limitations regarding the listing of advertisements. These artificial system limitations may be rules designed to generate the highest profitability from a business standpoint. For example, based on the user's advertisement and subject matter, the system may recommend an advertising combination to maximize their advertising effectiveness. It should be appreciated that although a single network file server, database server, content object table and rule table are depicted in FIG. 15, multiple such object may be provided for purposes of scalability and optimization of the operations of this system.

When an advertiser system 1410 offers an amount for an ad listing, that offer may be stored in the Content Object Table Database 1435. Periodically, the Network File Server 1440 accesses the ads stored in the Content Object Table Database 1435 via the Database Server 1425 and writes them to the Structured Content Database 1465.

Additionally, multiple end users 1445 may connect via the Internet to various distribution partners to the multi-node hierarchical content-based system's content. For example, the multi-node hierarchical content-based system may be presented as a web site, such as the assignee of the present invention, About.com at www.about.com. Also, various partners of the host system may engage the host for purposes of providing some or all of the content on their web sites. For example, a web site about Women's issues may desire to distribute the subject level node(s) related to women's issues. The advertisements associated with those nodes may then be delivered along with the content for those nodes through the distribution partner to the end user over the Internet.

A load balancer 1450 may monitor the multiple Internet connections, including requests to the server from one or more distribution partners. Via web server(s) 1552, these multiple users may look for the content from the multi-node hierarchical content-based system. These multiple users 1445 may look for documents using the hierarchical node structure or by inputting search key words. In either case, the Network file server 1440 may read these requests 1455 and provide pages with related content along with the listings associated with that document. Thus the advertisement system illustrated in FIG. 15 enables an advertiser to offer an amount for ad placement on one content specific node, different from the amount offered for placement on another content specific node less likely to generate sales.

Figure 18:
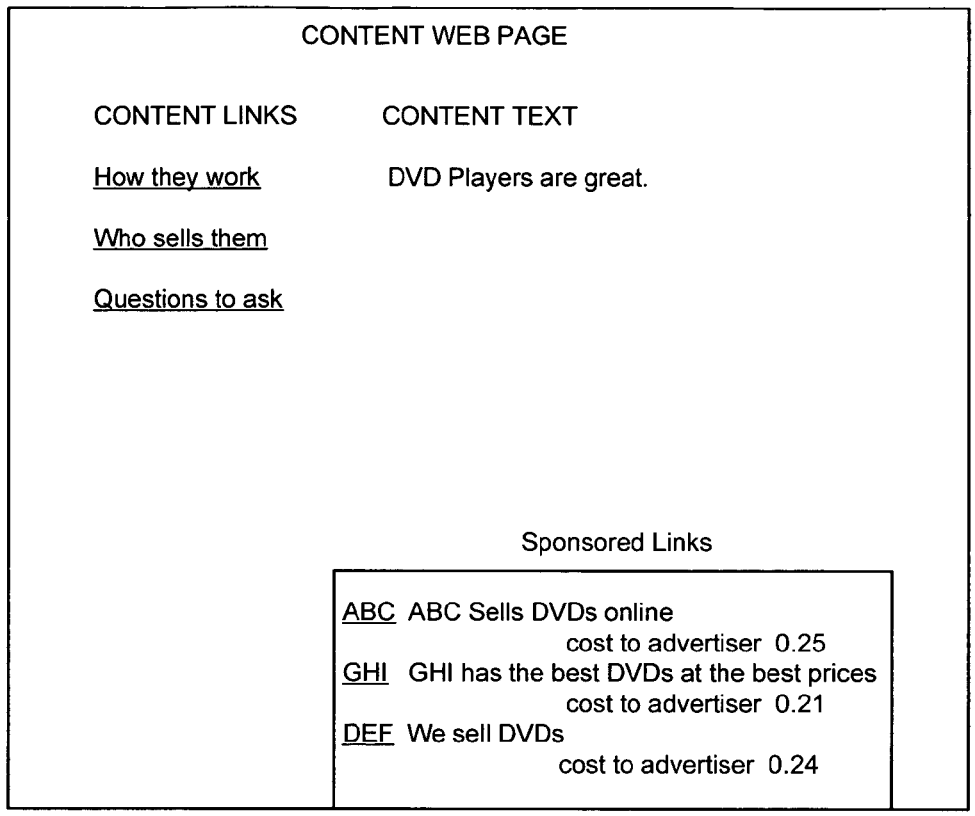
FIG. 18 depicts an exemplary content distribution page wherein advertisements are distributed in ranked order for the page based on an efficiency-based ranking system.

Once the advertisement system has accepted offers for placement of ads on a particular node, the advertisement system may publish those ads to the content specific node. For example, those ad listings may be published to a website, as mentioned above. For example, a document-level node may contain a single web page with informational content, links, graphics, chat, and other features related to the subject level, channel level and top level. Within that web page, some or all of the advertisers who placed ads for that level of specificity may be displayed. FIG. 18, as discussed above, provides one example of a single document-level node web page related to a document level node. That web page may be provided with the highest three bidders for that document-level, including the highest bidders for the higher-level nodes.

While the foregoing description includes details and specificities, it should be understood that such details and specificities have been included for the purposes of explanation only, and are not to be interpreted as limitations of the present invention. Many modifications to the embodiments described above can be made without departing from the spirit and scope of the invention, as it is intended to be encompassed by the following claims and their legal equivalents.

What is claimed is:

1. A computerized advertisement distribution and delivery system comprising one or more computers, the one or more computers implementing:

an advertisement image identification module for identifying a first advertisement image, for identifying first advertisement rankings for a first plurality of advertisements related to a specific distribution subject, and for storing a plurality of advertisements including highest-ranked advertisements in the first plurality of advertisements where storing includes storing the first advertisement image in association with a network-based locator;
an access indication module for receiving an indication of a user accessing an email, wherein the email includes the network-based locator;
an advertisement relationship determination module for evaluating current advertisement rankings of the first plurality of advertisements in response to the user accessing the email, for determining that the current advertisement rankings upon receiving the indication of the user accessing the email are different than the first advertisement rankings, for initiating the advertisement image identification module to identify a modified advertisement image in response to determining that the current advertisement rankings are different than the first advertisement rankings, wherein the modified advertisement image includes a second plurality of advertisements related to the specific distribution subject including one or more then highest-ranked advertisements, and for storing the modified advertisement image in association with the network-based locator; and
an advertisement image transmission module for transmitting the modified advertisement image for inclusion in the email when the email is presented to the user.

2. The computerized advertisement distribution and delivery system of claim 1, further comprising:
an advertisement input receiving module for receiving at least one advertisement associated with the specific distribution subject and a bid representing an amount to be paid for click-throughs by end-user recipients to a target site associated with the at least one advertisement.

3. The computerized advertisement distribution and delivery system of claim 2, wherein the advertisement rankings are determined based at least in part on the bid associated with the at least one advertisement for the specific distribution subject.

4. The computerized advertisement distribution and delivery system of claim 1, wherein the advertisement relationship determination module evaluates a grouping of advertisements based on an effective revenue efficiency of the grouping compared to other potential groupings of advertisements provided by advertisers for the specific distribution subject and determines the advertisement rankings for use in generating the advertisement image using a highest revenue efficiency grouping of a predetermined number of advertisements.

5. The computerized advertisement distribution system of claim 4, wherein the effective revenue efficiency is calculated by multiplying a number of click-throughs over a predetermined number of impressions with a bid amount associated with an advertisement of the grouping.

6. The computerized advertisement distribution and delivery system of claim 4, wherein the advertisement relationship determination module determines advertisement rankings when revenue efficiency calculations are made.

7. The computerized advertisement distribution system of claim 1, wherein the advertisement relationship determination module generates a ranking of listings as a grouping, the grouping comprising a ranked list of advertisements with a highest effective cost per thousand impressions.

8. The computerized advertisement distribution and delivery system of claim 1, wherein the advertisement relationship determination module determines advertisement rankings when any new bid value associated with an advertisement related to the specific distribution subject is received.

9. The computerized advertisement distribution and delivery system of claim 1, wherein the electronic document comprises a target network-based locator for each advertisement in at least one of the first and second pluralities of advertisements and the system further comprising a redirection server for receiving a request at a target network-based location and redirecting the request to a location associated with an advertisement associated with the target network-based locator in the electronic document.

10. The computerized advertisement distribution and delivery system of claim 1, wherein the modified advertisement image is a graphical image and advertisements are identified in corresponding portions of the graphical image.

11. The computerized advertisement distribution and delivery system of claim 10, wherein the advertisements are identified in corresponding portions of the graphical image by an HTML image map.

12. The computerized advertisement distribution and delivery system of claim 1, comprising:
an electronic document transmission module for creating and transmitting the electronic document containing content related to the specific distribution subject, and containing the network-based locator; and
wherein the request for an advertisement image is initiated by user access of the electronic document.

13. The computerized advertisement distribution and delivery system of claim 12, wherein the electronic document is an email.

14. A computer-implemented method, comprising:
identifying first advertisement rankings for a first plurality of advertisements related to a specific distribution subject;
identifying a first advertisement image including a plurality of advertisements including highest-ranked advertisements in the first plurality of advertisements;
identifying a stored location of the first advertisement image in association with a network-based locator;
providing an email including the network-based locator;
receiving an indication of a user accessing the provided email;
in response to receiving an indication of the user accessing the email, evaluating current advertisement rankings of the first plurality of advertisements;
determining that the current advertisement rankings upon receiving the indication of the user accessing the email are different than the first advertisement rankings;
in response to determining that the current advertisement rankings are different than the first advertisement rankings, identifying a modified advertisement image, wherein the modified advertisement image identifies a second plurality of advertisements related to the specific distribution subject, including one or more current highest-ranked advertisements of the first plurality of advertisements;
storing the modified advertisement image in association with the network-based locator; and
providing the modified advertisement image for inclusion in the email when the email is presented to the user;
wherein the receiving, evaluating and transmitting are performed by one or more computers.

15. The method of claim 14, further comprising:
evaluating a grouping of advertisements based on an effective revenue efficiency of the grouping compared to other potential groupings of advertisements provided by advertisers for the specific distribution subject and determining advertisement rankings for use in generating an advertisement image using a highest revenue efficiency grouping of a predetermined number of advertisements.

16. The method of claim 15, wherein the advertisement rankings are determined based at least in part on a bid value of associated with an advertisement for the specific distribution subject.

17. The method of claim 15, wherein the effective revenue efficiency is calculated by multiplying a number of click-throughs over a predetermined number of impressions with a bid amount associated with an advertisement of the grouping.

18. The method of claim 15, wherein advertisement rankings are determined when any new bid value associated with an advertisement related to the specific distribution subject is received.

19. The method of claim 15, wherein advertisement rankings are determined when revenue efficiency calculations are made.

20. The method of claim 15, wherein the electronic document comprises a target network-based locator for each advertisement in at least one of the first and second pluralities of advertisements and the method further comprising receiving a request at a target network-based location and redirecting the request to a location associated with an advertisement associated with the target network-based locator in the electronic document.

21. The method of claim 14, further comprising generating a ranking of listings as a grouping, the grouping comprising a ranked list of advertisements with a highest effective cost per thousand impressions.

22. A system comprising:
one or more computers; and
a computer-readable medium coupled to the one or more computers having instructions stored thereon which, when executed by the one or more computers, cause the one or more computers to perform operations comprising:
identifying first advertisement rankings for a first plurality of advertisements related to a specific distribution subject;
identifying a first advertisement image including a plurality of advertisements including highest-ranked advertisements;
identifying a stored location of the first advertisement image in association with a network-based locator;
providing an email including the network based locator;
receiving an indication of a user provided email;
in response to receiving an indication of the user accessing the email, evaluating current advertisement rankings of the first plurality of advertisements;
determining that the current advertisement rankings upon receiving the indication of the user accessing the email are different than the first advertisement rankings;
in response to determining that the current advertisement rankings are different than the first advertisement rankings, identifying a modified advertisement image, wherein the modified advertisement image identifies a second plurality of advertisements related to the specific distribution subject and includes a plurality of advertisements including one or more current highest-ranked advertisements;
storing the modified advertisement image in association with the network-based locator; and
providing the modified advertisement image for inclusion in the email when the email is presented to the user.

23. A computer storage medium encoded with a computer program, the program comprising instructions that when executed by data processing apparatus cause the data processing apparatus to perform operations comprising:
identifying first advertisement rankings for a first plurality of advertisements related to a specific distribution subject;
identifying a first advertisement image including a plurality of advertisements including highest-ranked advertisements in the first plurality of advertisements;
identifying a stored location of the first advertisement image in association with a network-based locator;
providing an email including the network-based locator;
receiving an indication of a user accessing the provided email;
in response to receiving an indication of the user accessing the email, evaluating current advertisement rankings of the first plurality of advertisements;
determining that the current advertisement rankings upon receiving the indication of the user accessing the email are different than the first advertisement rankings;
in response to determining that the current advertisement rankings are different than the first advertisement rankings, identifying a modified advertisement image, wherein the modified advertisement image identifies a second plurality of advertisements related to the specific distribution subject, including one or more current highest-ranked advertisements of the first plurality of advertisements;
storing the modified advertisement image in association with the network-based locator; and
providing the modified advertisement image for inclusion in the email when the email is presented to the user.

24. A method, comprising:
identifying a plurality of advertisements associated with a distribution subject;
determining a first ranking of the plurality of advertisements;
storing an association between a first advertisement as a highest-ranked advertisement, the storing including associating the first advertisement with a network-based locator;
providing an email including the network-based locator;
receiving an indication of a user accessing the email;
determining a second ranking of the plurality of advertisements;
determining that the first ranking of the plurality of advertisements upon receiving the indication of the user accessing the email is different from the second ranking of the plurality of advertisements;
in response to determining that the first ranking of the plurality of advertisements is different than the second ranking of the plurality of advertisements, storing a second advertisement as the highest-ranked advertisement, the storing including associating the second advertisement with the network based locator; and
providing the second advertisement for inclusion in the email upon receiving the indication of the user accessing the email,
wherein the identifying, ranking, and providing are performed by one or more computers.

* * * * *

UNITED STATES PATENT AND TRADEMARK OFFICE
CERTIFICATE OF CORRECTION

PATENT NO. : 8,311,890 B2  
APPLICATION NO. : 10/647116  
DATED : November 13, 2012  
INVENTOR(S) : Kevin R J B Donovan et al.

Page 1 of 1

It is certified that error appears in the above-identified patent and that said Letters Patent is hereby corrected as shown below:

Title Page, Column 2, Line 15 at Abstract; replace:
"included with each advertisement image reference (.e.g., one" with
-- included with each advertisement image reference (e.g., one --

Signed and Sealed this
Second Day of April, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,311,890 B2 | Page 1 of 1 |
| APPLICATION NO. | : 10/647116 | |
| DATED | : November 13, 2012 | |
| INVENTOR(S) | : Kevin R J B Donovan | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1707 days.

Signed and Sealed this
Eleventh Day of November, 2014

Michelle K. Lee
*Deputy Director of the United States Patent and Trademark Office*